United States Patent
Kim et al.

(10) Patent No.: US 10,707,912 B2
(45) Date of Patent: Jul. 7, 2020

(54) MOBILE ELECTRONIC APPARATUS, ACCESSORY DEVICE THEREFOR, AND ELECTRONIC APPARATUS INCLUDING THE ACCESSORY DEVICE

(71) Applicant: SAMSUNG ELECTRONICS CO., LTD., Suwon-si (KR)

(72) Inventors: Yong Kim, Seoul (KR); Eun-young Cho, Seoul (KR); Mi-jeong Song, Suwon-si (KR); Sang-hun Lee, Yongin-si (KR); Sung-hwan Park, Ansan-si (KR); Chang-jun Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/123,908

(22) PCT Filed: Mar. 4, 2015

(86) PCT No.: PCT/KR2015/002108
§ 371 (c)(1),
(2) Date: Sep. 6, 2016

(87) PCT Pub. No.: WO2015/133827
PCT Pub. Date: Sep. 11, 2015

(65) Prior Publication Data
US 2017/0026069 A1    Jan. 26, 2017

(30) Foreign Application Priority Data
Mar. 4, 2014  (KR) .................. 10-2014-0025669

(51) Int. Cl.
*H04B 1/3888* (2015.01)
*H04M 1/02* (2006.01)
(Continued)

(52) U.S. Cl.
CPC ........ *H04B 1/3888* (2013.01); *H04M 1/0214* (2013.01); *H04M 1/0254* (2013.01); *H04M 1/7253* (2013.01); *H04M 1/185* (2013.01)

(58) Field of Classification Search
CPC .................................... H04B 1/3888; H04M 1/7253; H04M 1/0214; H04M 1/0254; H04M 1/185
(Continued)

(56) References Cited

U.S. PATENT DOCUMENTS 7,747,007 B2   6/2010  Hyun et al.
8,253,518 B2   8/2012  Lauder et al.
(Continued)

FOREIGN PATENT DOCUMENTS

CN   1592128 A    3/2005
CN   101034146 A  9/2007
(Continued)

OTHER PUBLICATIONS

Search Report dated May 26, 2015 issued by the International Searching Authority in counterpart International Patent Application No. PCT/KR2015/002108 (PCT/ISA/210).
(Continued)

*Primary Examiner* — Edward F Urban
*Assistant Examiner* — Angelica M Perez
(74) *Attorney, Agent, or Firm* — Sughrue Mion, PLLC

(57) ABSTRACT

Provided are a mobile electronic apparatus, an accessory device for the mobile electronic apparatus, and an electronic apparatus including the accessory device. The mobile electronic apparatus includes: a display unit including a display screen; a cover detector detecting identification (ID) information of a cover when the display screen is covered by the cover; and a processor displaying a user interface (UI) screen corresponding to the cover on the display screen by
(Continued)

driving a program corresponding to the ID information of the cover when receiving the ID information of the cover.

19 Claims, 20 Drawing Sheets

(51) Int. Cl.
*H04M 1/725* (2006.01)
*H04M 1/18* (2006.01)

(58) Field of Classification Search
USPC ............ 455/515.8, 550, 41.1–41.3; 379/434, 379/433.12, 433.11, 128.01, 433.01
See application file for complete search history.

(56) References Cited

U.S. PATENT DOCUMENTS

| | | | | |
|---|---|---|---|---|
| 2003/0224831 | A1* | 12/2003 | Engstrom | H01Q 1/245 455/566 |
| 2004/0203502 | A1* | 10/2004 | Dietrich | H04M 1/72575 455/90.3 |
| 2004/0248621 | A1 | 12/2004 | Schon | |
| 2005/0054391 | A1* | 3/2005 | Chen | H04M 1/72575 455/575.1 |
| 2006/0030377 | A1* | 2/2006 | White | B23Q 1/0009 455/575.1 |
| 2010/0045628 | A1 | 2/2010 | Gettemy et al. | |
| 2010/0078343 | A1* | 4/2010 | Hoellwarth | B29C 45/14639 206/320 |
| 2010/0238119 | A1* | 9/2010 | Dubrovsky | G06F 1/1626 345/169 |
| 2011/0035695 | A1 | 2/2011 | Fawcett et al. | |
| 2011/0090626 | A1 | 4/2011 | Hoellwarth et al. | |
| 2012/0066865 | A1 | 3/2012 | Lauder et al. | |
| 2012/0068799 | A1 | 3/2012 | Lauder et al. | |
| 2012/0072167 | A1 | 3/2012 | Cretella, Jr. et al. | |
| 2012/0212430 | A1 | 8/2012 | Jung et al. | |
| 2012/0242399 | A1* | 9/2012 | Liu | H04M 1/0262 327/517 |
| 2013/0300679 | A1* | 11/2013 | Oh | A45C 11/00 345/173 |
| 2013/0328914 | A1* | 12/2013 | Smith | G06F 3/01 345/173 |
| 2014/0159839 | A1 | 6/2014 | Kim | |
| 2014/0240253 | A1* | 8/2014 | Choi | G06F 3/041 345/173 |
| 2014/0285033 | A1* | 9/2014 | Jantunen | H04B 5/0031 307/149 |
| 2014/0304806 | A1* | 10/2014 | Koo | G06K 7/081 726/16 |
| 2015/0026623 | A1* | 1/2015 | Horne | G06F 3/04847 715/771 |
| 2015/0245385 | A1* | 8/2015 | Nambord | H04B 5/0031 455/41.1 |

FOREIGN PATENT DOCUMENTS

| | | |
|---|---|---|
| CN | 202353645 U | 7/2012 |
| CN | 103385591 A | 11/2013 |
| JP | 2008-258898 A | 10/2008 |
| KR | 10-2009-0044849 A | 5/2009 |
| KR | 10-2013-0018393 A | 2/2013 |
| KR | 10-2013-0036274 A | 4/2013 |
| WO | 2014/010797 A1 | 1/2014 |

OTHER PUBLICATIONS

Written Opinion dated May 26, 2015 issued by the International Searching Authority in counterpart International Patent Application No. PCT/KR2015/002108 (PCT/ISA/237).

Communication dated Jun. 1, 2018, issued by the Chinese Patent Office in counterpart Chinese Application No. 201580022676.3.

Communication dated Feb. 1, 2019 issued by the State Intellectual Property Office of P.R. China in counterpart Chinese Application No. 201580022676.3.

Communication dated Dec. 2, 2019 issued by the Korean Intellectual Property Office in counterpart Korean Patent Application No. 10-2014-0025669.

Communication dated Aug. 27, 2019, issued by the State Intellectual Property Office of P.R. China in counterpart Chinese Application No. 201580022676.3.

* cited by examiner

MOBILE ELECTRONIC APPARATUS, ACCESSORY DEVICE THEREFOR, AND ELECTRONIC APPARATUS INCLUDING THE ACCESSORY DEVICE

TECHNICAL FIELD

One or more exemplary embodiments relate to mobile electronic apparatuses, and more particularly, to a mobile electronic apparatus, an accessory device for the mobile electronic apparatus, and an electronic apparatus including the accessory device.

BACKGROUND ART

There is a flip cover type case as an example of a smartphone case. The flip cover type case is classified into a general simple type case that protects a smartphone screen and a smart cover type case that provides a function of actively turning on or off a smartphone by using a magnetic chip attached to the inside of a flip cover when a user opens or closes the flip cover. Also, recently, the flip cover type case has been developed to provide a function of receiving a phone call or checking the current time through a transparent portion of the cover.

In general, a smartphone cover is limited to a function of turning on or off a smartphone screen by detecting the opening or closing of the cover and a function of displaying message reception notification or time information through a small window formed in the cover.

DISCLOSURE OF INVENTION

Technical Problem

One or more exemplary embodiments include a mobile electronic apparatus that provides a user-customized function by executing a user-desired application when covered by a flip cover type accessory device.

One or more exemplary embodiments include an accessory device for the mobile electronic apparatus that may also protect the liquid crystal of the mobile electronic apparatus.

One or more exemplary embodiments include an electronic apparatus including the flip cover type accessory device.

Additional aspects will be set forth in part in the description which follows and, in part, will be apparent from the description, or may be learned by practice of the presented exemplary embodiments.

Solution to Problem

According to one or more exemplary embodiments, a mobile electronic apparatus includes: a display unit including a display screen; a cover detector detecting identification (ID) information of a cover when the display screen is covered by the cover; and a processor performing control such that a user interface (UI) screen corresponding to the cover is displayed on the display screen, by driving a program corresponding to the ID information of the cover when receiving the ID information of the cover.

According to one or more exemplary embodiments, a mobile electronic apparatus includes: a display unit including a display screen; a cover detector detecting, when an accessory device includes a display cover covering the display screen and a battery cover covering a battery, ID information of the accessory device by using a magnet or a memory attached to the battery cover; and a processor displaying a UI screen corresponding to the accessory device on the display screen by driving a program corresponding to the ID information of the accessory device when the display screen is covered by the display cover.

According to one or more exemplary embodiments, an accessory device for a mobile electronic apparatus includes: a cover configured to cover a display screen of the mobile electronic apparatus; and a cover ID mark portion attached to the cover and identified by the mobile electronic apparatus, wherein when the display screen is covered by the cover, a UI screen corresponding to the cover ID mark portion is displayed on the display screen by the mobile electronic apparatus.

According to one or more exemplary embodiments, an accessory device for a mobile electronic apparatus includes: a display cover configured to cover a display screen of the mobile electronic apparatus; a battery cover integrated with the display cover and configured to cover a battery of the mobile electronic apparatus; and a cover ID mark portion used to identify the accessory device, wherein when the display screen is covered by the display cover, a UI screen corresponding to the cover ID mark portion is displayed on the display screen by the mobile electronic apparatus.

According to one or more exemplary embodiments, an electronic apparatus includes: a mobile electronic apparatus; and an accessory device including a cover covering a display screen of the mobile electronic apparatus, and a cover ID mark portion attached to the cover and identified by the mobile electronic apparatus, wherein the mobile electronic apparatus includes: a display unit including a display screen; a cover detector detecting ID information of the cover when the display screen is covered by the cover; and a processor performing control such that a UI screen corresponding to the cover is displayed on the display screen, by driving a program corresponding to the ID information of the cover when receiving the ID information of the cover.

According to one or more exemplary embodiments, an electronic apparatus includes: a mobile electronic apparatus; and an accessory device including a display cover configured to cover a display screen of the mobile electronic apparatus, a battery cover configured to cover a battery of the mobile electronic apparatus, and a cover ID mark portion, wherein the mobile electronic apparatus includes: a display unit including the display screen; a cover detector detecting ID information of the accessory device by using a magnet or a memory attached to the battery cover; and a processor displaying a UI screen corresponding to the accessory device on the display screen by driving a program corresponding to the ID information of the accessory device when the display screen is covered by the display cover.

Advantageous Effects of Invention

According to the one or more of the above exemplary embodiments, according to the mobile electronic apparatus, the accessory device for the mobile electronic apparatus, and the electronic apparatus including the accessory device, the mobile electronic apparatus (e.g., a smartphone) may be utilized according to the personal characteristics or conditions of the user. The users using the exemplary embodiments may include a silver generation, persons playing a game frequently, persons using an SNS frequently, persons exercising frequently, and users having various life patterns.

Also, according to the exemplary embodiments, the user may quickly and simple use a desired function and may use a conventional function of the mobile electronic apparatus (e.g., a smartphone function). When the cover of the mobile electronic apparatus (e.g., a smartphone) is closed, the user may immediately use a function corresponding to the cover ID. Also, when the cover of the smartphone is opened, a relevant function is disabled and thus a conventional function of the smartphone may be used as it is.

Also, the intuition of use may be increased by a physical click feel that is transferred to the user by the button. Since a physical button touch feel is provided to the user by a pressure detection method or an embossed structure, the user may sense a pressing feel that is not provided by the conventional touch method. This solves a user's strange feel between operation reactions in a conventional touch-type smart device, thus providing a more intuitive user experience.

According to the exemplary embodiments, since a front portion of a mobile electronic apparatus using a smart cover (e.g., a smart device such as a smartphone) may be covered and protected by the accessory device and the smart cover may be easily replaced for each type, the user may easily and quickly perform desired functions and configurations.

Also, when using a function corresponding to the user characteristics, the user may sense a button touch feel and experience a more extensive and intuitive interface.

The foregoing is illustrative of exemplary embodiments and is not to be construed as limiting thereof. Although the exemplary embodiments have been described above, those of ordinary skill in the art will readily appreciate that various modifications are possible in the exemplary embodiments without materially departing from the concepts and features of the exemplary embodiments. Therefore, it is to be understood that the exemplary embodiment described above should be considered in a descriptive sense only and not for purposes of limitation. For example, elements described as being combined may also be implemented in a distributed manner, and elements described as being distributed may also be implemented in a combined manner.

Therefore, the scope of the inventive concept is defined not by the detailed description of the exemplary embodiments but by the appended claims, and all modifications or differences within the scope should be construed as being included in the inventive concept.

It should be understood that the exemplary embodiments described herein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope of the inventive concept as defined by the following claims.

BRIEF DESCRIPTION OF DRAWINGS

These and/or other aspects will become apparent and more readily appreciated from the following description of exemplary embodiments, taken in conjunction with the accompanying drawings in which.

MODE FOR THE INVENTION

Figure 1:
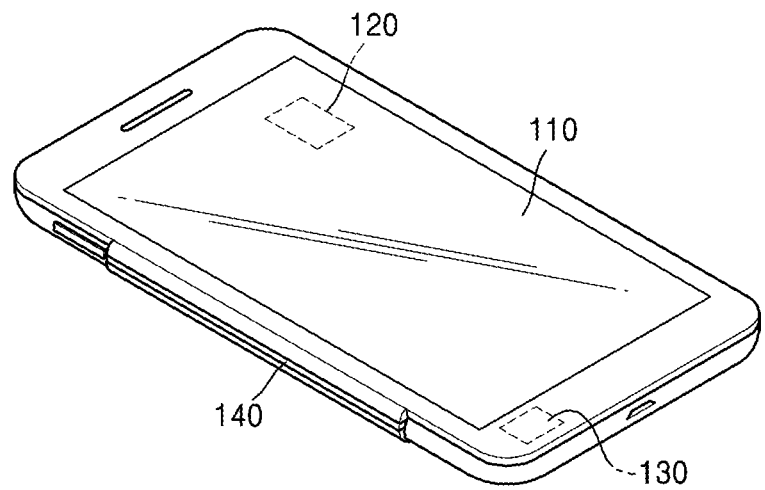
FIG. 1 is a perspective view of a mobile electronic apparatus according to an exemplary embodiment.

Reference will now be made in detail to exemplary embodiments, examples of which are illustrated in the accompanying drawings, wherein like reference numerals refer to like elements throughout. In this regard, the present exemplary embodiments may have different forms and should not be construed as being limited to the descriptions set forth herein. Accordingly, the exemplary embodiments are merely described below, by referring to the figures, to explain aspects of the present description.

Hereinafter, exemplary embodiments will be described in detail with reference to the accompanying drawings. Embodiments described in this specification and configurations illustrated in the accompanying drawings are merely exemplary and do not represent all of the inventive concept. Therefore, it will be understood that various equivalents, modifications, or changes may be made therein without departing from the scope of the inventive concept.

Figure 2:
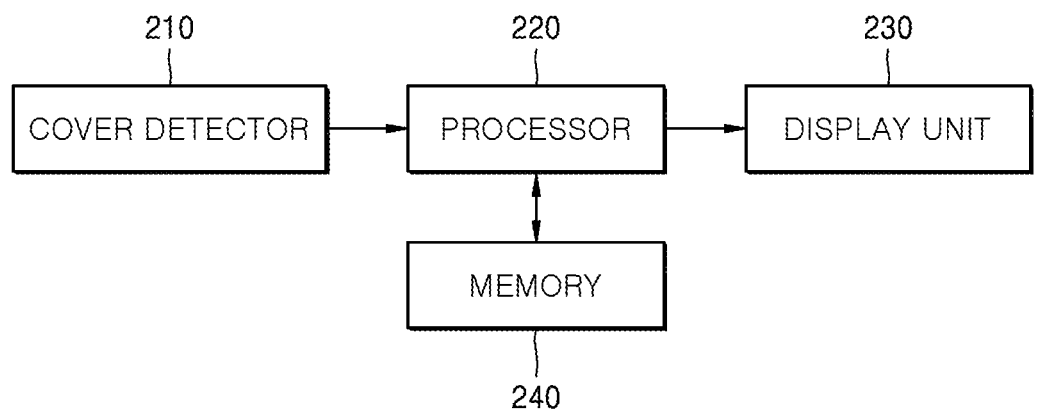
FIG. 2 is a block diagram of a mobile electronic apparatus according to an exemplary embodiment.

FIG. 1 is a perspective view of a mobile electronic apparatus according to an exemplary embodiment. FIG. 2 is a block diagram of a mobile electronic apparatus according to an exemplary embodiment.

The configuration of a mobile electronic apparatus according to an exemplary embodiment will be described with reference to FIGS. 1 and 2. The mobile electronic apparatus may include a display unit 230 including a display screen 110, a cover detector 130 or 210, and a processor 120 or 220, and may further include a connecting portion 140.

The display unit 230 displays the execution results of a program executed by the processor 120 or 220 of the mobile electronic apparatus, and the display screen 110 is a display medium on which the execution results of a program driven by the processor 120 or 220 of the mobile electronic apparatus are displayed. Also, the display unit 230 displays a user interface (UI) screen, which is generated by the execution of the program and corresponds to a cover, on the display screen 110.

When the display screen 110 of the mobile electronic apparatus (e.g., a smartphone) is covered by the cover, the cover detector 130 or 210 obtains identification (ID) information of the cover by detecting a cover ID mark portion included in the cover. In this case, when the display screen 110 is covered by the cover, the cover detector 130 or 210 and the cover ID mark portion may be located to face each other.

When ID information of the cover detected by the cover detector 130 or 210 is obtained, the processor 120 or 220 drives a program corresponding to the ID information. Also, when the display screen 110 is not covered by the cover, for example, when the cover is opened to separate from the display screen 110, the processor 120 performs control such that the UI screen corresponding to the cover is not displayed on the display screen 110. Herein, the cover may be formed of a transparent material. In the present exemplary embodiment, the cover may be formed of any material that allows an image displayed on the display screen 110 to be shown to a user even when the display screen 110 is covered by the cover.

The cover detector 130 or 210 is generally a sensor and may be any other device that may detect the cover. The sensor senses the cover ID mark portion included in the cover. The cover ID mark portion may be, for example, a magnetic chip. The sensor may be, for example, a magnet sensor that senses the magnetic chip. The magnet sensor may be generally a Hall sensor and may be any other sensor that may sense the magnetic chip. The cover may be identified according to the positions, number, polarities, or sizes of magnets attached to the cover. When a plurality of magnets are provided, the cover may be identified according to the dispositions of the magnets. In this case, when a signal of the sensor sensing the cover ID mark portion varies, the processor 120 or 220 detects another cover and drives another program corresponding to the signal.

Also, other examples of the sensor may be an illuminance sensor that senses the cover ID mark portion on the basis of illuminance, a camera that captures an image of the cover ID mark portion to identify the cover, and a proximity sensor that senses the cover ID mark portion according to the proximity of the cover.

Also, another example of the cover detector 130 or 210 may be a near field communication (NFC) detector. The NFC detector identifies the cover by detecting an NFC tag attached to the cover.

When the display screen 110 is covered by the cover, the processor 120 or 220 may connect to a server (not illustrated) located outside the mobile electronic apparatus, receive a program corresponding to the cover from the server, and install the received program in the mobile electronic apparatus. The server may be wirelessly connected to the mobile electronic apparatus through a network.

The mobile electronic apparatus according to the present exemplary embodiment may include the connecting portion 140. The connecting portion 140 physically connects the cover and the mobile electronic apparatus.

Figure 3:
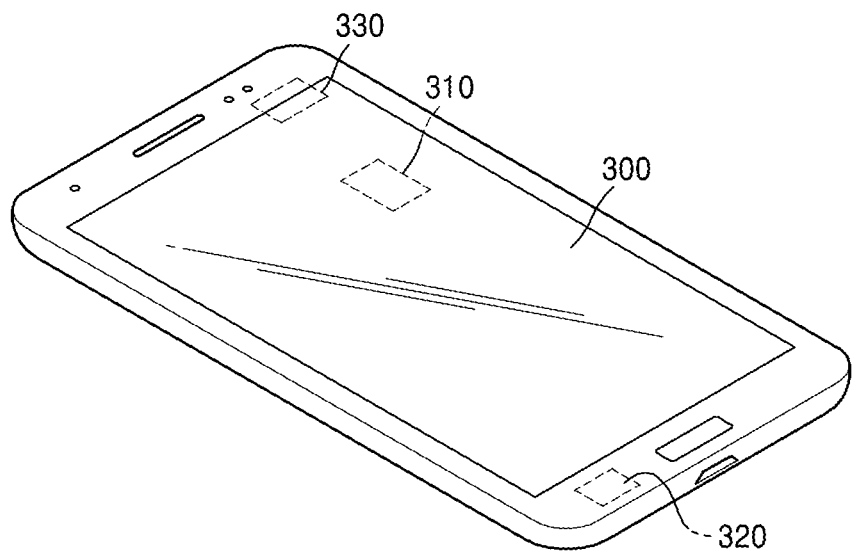
FIG. 3 is a perspective view of a mobile electronic apparatus according to another exemplary embodiment.
Figure 4:
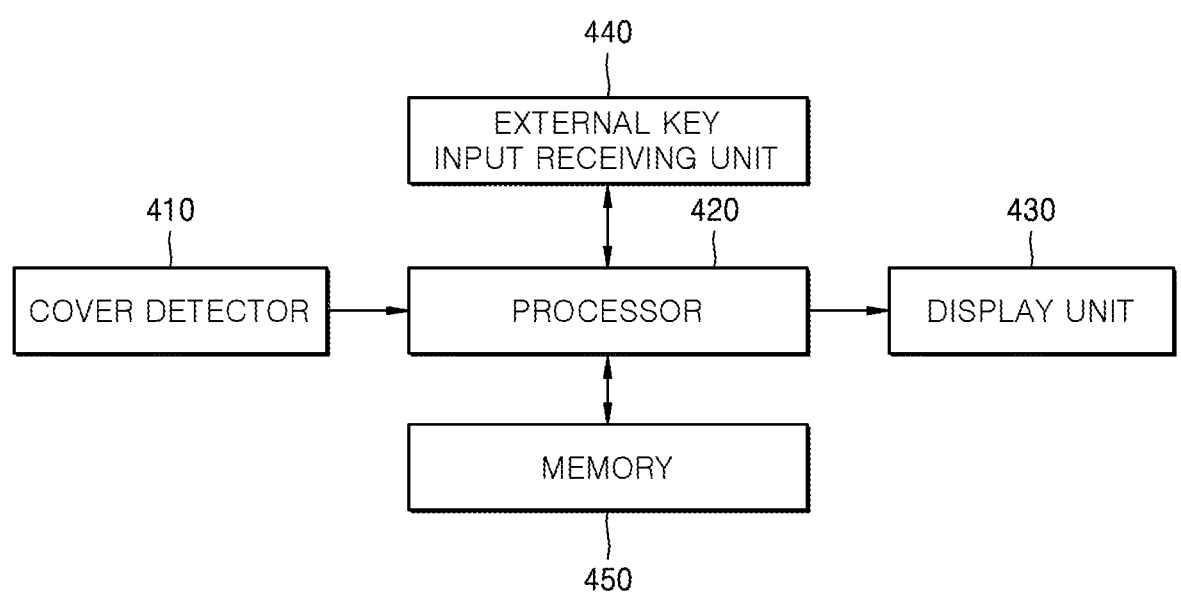
FIG. 4 is a block diagram of a mobile electronic apparatus according to another exemplary embodiment.

FIG. 3 is a perspective view of a mobile electronic apparatus according to another exemplary embodiment. FIG. 4 is a block diagram of a mobile electronic apparatus according to another exemplary embodiment.

The mobile electronic apparatus according to another exemplary embodiment may include a display unit 430 including a display screen 300, a cover detector 320 or 410, and a processor 310 or 420, and may further include an external key input receiving unit 330 or 440.

The display unit 430 displays the execution results of a program executed by the processor 310 or 420 of the mobile electronic apparatus, and the display screen 300 is a display medium on which the execution results of a program driven by the processor 310 or 420 of the mobile electronic apparatus are displayed.

When the display screen 300 is covered by a cover covering the mobile electronic apparatus (e.g., a smartphone), the cover detector 320 or 410 detects ID information of the cover. The mobile electronic apparatus (e.g., a smartphone) may be equipped with an accessory device that covers a display screen of a front side and a battery of a rear side. The accessory device may include a display cover and a battery cover. The display cover covers the display screen of the mobile electronic apparatus, and the battery cover is attached to the rear side of the mobile electronic apparatus to cover the battery of the mobile electronic apparatus.

A memory or a magnet may be installed in or attached to the battery cover. In this case, the cover detector 320 detects ID information of the accessory device by using the magnet or cover ID information stored in the memory installed in the battery cover. The battery cover and the mobile electronic apparatus may include a contact point or a connector that may be connected when the battery cover and the mobile electronic apparatus are coupled together. When the battery cover and the mobile electronic apparatus are electrically connected to each other through the contact point or the connector, the accessory device may be identified by reading the ID information of the accessory device stored in the memory. Also, an NFC tag may be installed in or attached to the battery cover, and the cover may be identified by detecting the NFC tag by an NFC detector installed in the mobile electronic apparatus.

When the display screen of the smartphone is covered by the display cover, the processor 310 executes a program corresponding to the ID information of the accessory device detected by the cover detector 320. When the program is executed, the display unit 430 displays a UI screen corresponding to the accessory device on the display screen 300. On the other hand, when the display screen 300 is not covered by the accessory device, for example, when the accessory device and the display screen 300 are separated from each other after the display screen 300 is covered by the accessory device, the UI screen is not displayed on the display screen 300.

The mobile electronic apparatus may further include the external key input receiving unit 330. The external key input receiving unit 330 receives an external key input from an external key input unit (not illustrated) installed in the display cover of the accessory device. The accessory device and the mobile electronic apparatus may include a contact point or a connector for electrical connection. The connector may include a coaxial cable and a flexible printed circuit board (FPCB), and may include only a contact point or a connection terminal. Also, the connector may be connected to a secure digital (SD) card slot installed in the mobile electronic apparatus, and thus the external key input unit may receive power supply through the connector.

The display cover of the accessory device may include a cover ID mark portion for identification of the accessory device. The cover detector 320 detects the cover ID mark portion of the display cover of the accessory device. The cover detector 320 may include a sensor embedded in the mobile electronic apparatus and may detect the cover ID mark portion of the accessory device through the sensor. In this case, the cover detector and the cover ID mark portion may be installed to correspond to each other when the display screen of the mobile electronic apparatus is covered by the display cover of the accessory device.

The cover ID mark portion of the accessory device may be, for example, a magnetic chip. The sensor may be, for example, a magnet sensor that senses the magnetic chip. The accessory device may be identified according to the positions, number, polarities, or sizes of magnets attached to the cover. When a plurality of magnets are installed or attached, the ID information of the cover may be discriminated according to the dispositions of the magnets.

In this case, when a signal of the sensor sensing the cover ID mark portion of the accessory device varies, the processor 310 or 420 detects another accessory device and drives another program corresponding to the signal. Also, another example of the sensor may be an illuminance sensor that senses the cover ID mark portion on the basis of illuminance. In this case, the cover is identified according to the position of the cover ID mark portion attached to the cover.

Also, another example of the cover detector 320 or 410 may be an NFC detector. The NFC detector identifies the cover by detecting an NFC tag attached to the cover.

A memory may be installed in the battery cover of the accessory device, and a program, which may be executed by the processor of the mobile electronic apparatus, may be stored in the memory. When the display cover covers the display screen 300 of the mobile electronic apparatus (e.g., a smartphone), the program stored in the memory attached to the battery cover may be executed by the processor 310 or 420. Also, the program stored in the memory attached to the battery cover may be installed in a memory 450 embedded in the mobile electronic apparatus.

Figure 5:
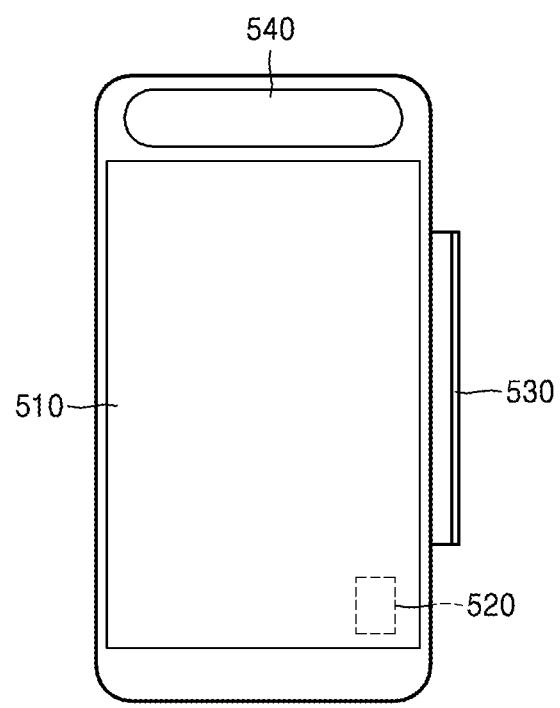
FIG. 5 is a plan view of an accessory device for a mobile electronic apparatus according to an exemplary embodiment.

FIG. 5 is a plan view of an accessory device for a mobile electronic apparatus according to an exemplary embodiment.

The accessory device for a mobile electronic apparatus may include a cover 510 and a cover ID mark portion 520, and may further include a connecting portion 530.

The cover 510 is to cover a display screen of the mobile electronic apparatus. The cover 510 may be formed of a transparent material. In the present exemplary embodiment, the cover 510 may be formed of any material that allows a displayed image to be shown to the user even when the display screen is covered by the cover 510.

The cover ID mark portion 520 may be installed in or attached to the cover 510, and may be identified by the mobile electronic apparatus. The cover ID mark portion 520 may be sensed by a sensor embedded in the mobile electronic apparatus. The sensor may be, for example, a magnet sensor, an illuminance sensor, or a proximity sensor.

When the cover ID mark portion 520 is detected by a magnet sensor embedded in the mobile electronic apparatus, the cover ID mark portion 520 may be a magnetic chip sensed by the magnet sensor. The ID information of the cover may be discriminated according to the positions, number, polarities, or sizes of magnets attached to the cover. When a plurality of magnets are installed in or attached to the cover, the ID information of the cover may be discriminated according to the dispositions of the magnets.

Also, the cover ID mark portion 520 may be detected by an illuminance sensor embedded in the mobile electronic apparatus. In this case, the cover ID mark portion 520 may be sensed by the illuminance sensor, and the ID information of the cover may be discriminated according to the position of the cover ID mark portion 520 attached to the cover.

Also, the cover ID mark portion 520 may be detected by an NFC detector embedded in the mobile electronic apparatus. In this case, the cover ID mark portion 520 may be an NFC tag, and the cover may be identified by reading the NFC tag by the NFC detector.

When the cover 510 covers the display screen of the mobile electronic apparatus (e.g., a smartphone), a UI screen corresponding to the cover ID mark portion 520 is displayed on the display screen of the smartphone. For example, when the cover 510 covers the smartphone, the cover 510 may be identified by sensing a magnet of the cover ID mark portion 520 by a magnet sensor embedded in the smartphone, a program corresponding to the identified cover 510 may be executed, and an execution result, for example, a UI screen may be displayed on the display screen of the smartphone.

The cover 510 may include a button portion 540. The button portion 540 may be embossed in a predetermined region of the cover 510 to provide various touch feels formed by the embossing when the user presses the embossed region.

The accessory device according to the present exemplary embodiment may include the connecting portion 530. The connecting portion 530 may connect the mobile electronic apparatus (e.g., a smartphone) and the cover 510 to attach the cover 510 to the smartphone.

Figure 6A:
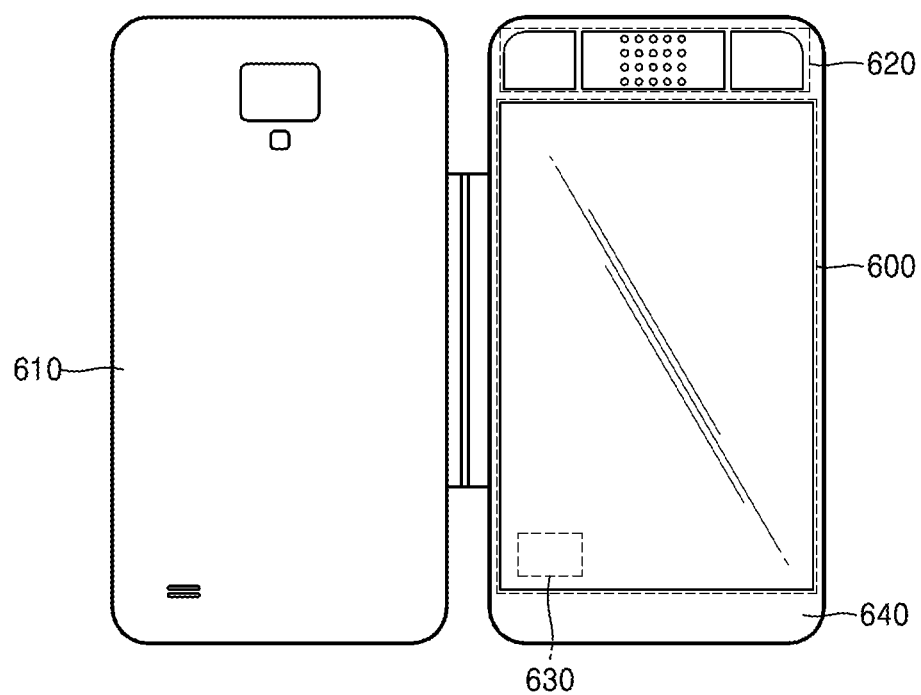
FIGS. 6A and 6B are plan views of an accessory device for a mobile electronic apparatus according to another exemplary embodiment.
Figure 6B:
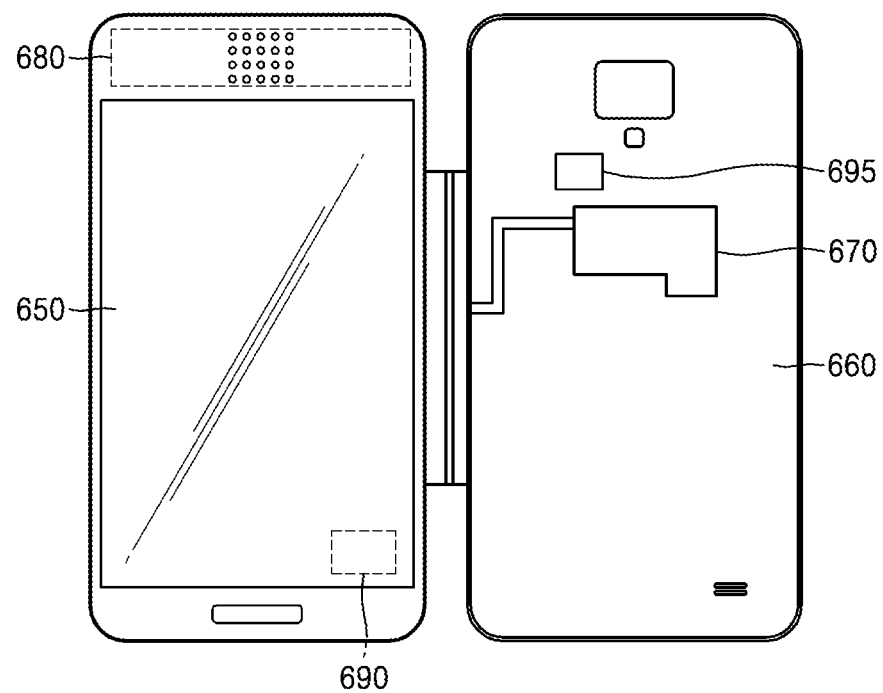

FIGS. 6A and 6B are plan views of an accessory device for a mobile electronic apparatus according to another exemplary embodiment. FIG. 6A is an outside plan view of the accessory device for a mobile electronic apparatus, and FIG. 6B is an inside plan view of the accessory device for a mobile electronic apparatus.

Referring to FIG. 6A, the accessory device for a mobile electronic apparatus may include a display cover 600, a battery cover 610, and a cover ID mark portion 630.

The display cover 600 covers a display screen of the mobile electronic apparatus (e.g., a smartphone). The battery cover 610 may cover the entire bottom side of the mobile electronic apparatus (e.g., a smartphone) at which a battery is installed, and may be easily attached/detached to/from the mobile electronic apparatus. The battery cover 610 may be connected to a connector.

The display cover 600 and the battery cover 610 are united together.

The display cover 600 may include a button-type external key input unit 620. When the user inputs a key through the external key input unit 620, the key input is transmitted to the mobile electronic apparatus. The display cover 600 may include a cover frame 640. The cover frame 640 may connect a film portion and a button portion to maintain the shape of the display cover 600 and cover the entire front portion of the mobile electronic apparatus.

The cover ID mark portion 630 may include an ID mark for identification of the accessory device, and may be disposed in the display cover 600 or the battery cover 610. The cover ID mark portion 630 may be, for example, a magnetic chip that may be sensed by a magnet sensor. The accessory device may be identified according to the positions, number, polarities, or sizes of magnets attached to the display cover 600. When a plurality of magnets are installed or attached, the ID information of the cover may be discriminated according to the dispositions of the magnets.

Another example of the cover ID mark portion 630 may be an NFC tag that may be detected by an NFC detector. The NFC detector identifies the cover by detecting an NFC tag attached to the display cover 600.

When the display screen of the mobile electronic apparatus (e.g., a smartphone) is covered by the display cover 600, the smartphone detects the cover ID mark portion 630 and executes a program corresponding to the detected cover ID mark portion 630 to display a UI screen on the display screen.

Referring to FIG. 6B, a battery cover 660 may include a connector 670 and an external key input unit 680. The connector 670 may be connected to an SD card slot included in the mobile electronic apparatus. The external key input unit 680 may have a button shape and may be embodied by using a printed circuit board (PCB). When the SD card slot and the connector 670 are connected to each other, the external key input unit 680 may receive power supply through the connector 670 to supply power to the PCB of the external key input unit 680. The external key input unit 680 may be disposed in a region other than a top region of a display cover 650. The connector 670 may be connected to a wireless charge terminal, and the connector and the mobile electronic apparatus may be connected in various other ways.

A memory 695 may be attached to the battery cover 660 of the accessory device, and a program, which may be executed by the mobile electronic apparatus, may be stored in the memory 695. When the display cover 600 or 650 covers the display screen of the mobile electronic apparatus (e.g., a smartphone), the program stored in the memory 695 attached to the battery cover 660 may be executed by a processor embedded in the smartphone. Also, the program stored in the memory 695 attached to the battery cover 660 may be installed in a memory embedded in the mobile electronic apparatus.

Figure 7:
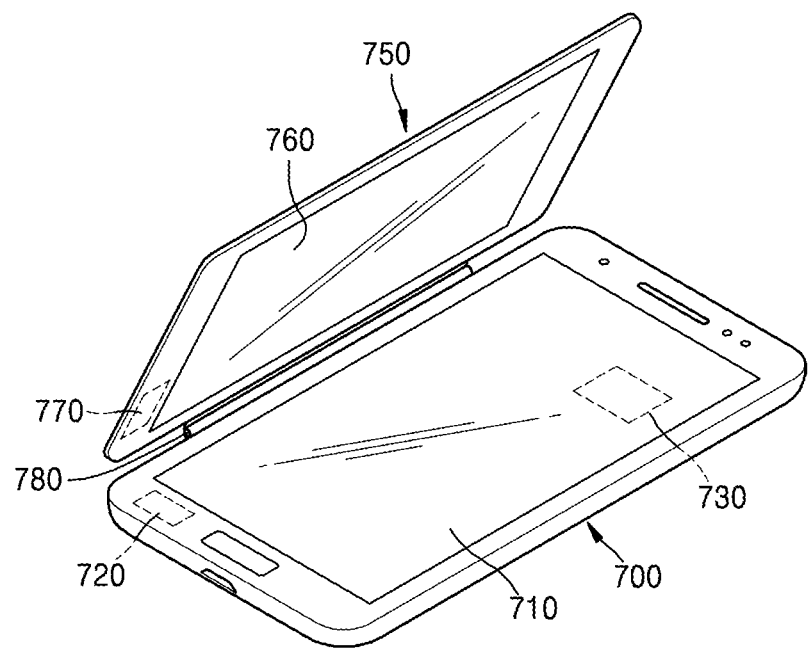
FIG. 7 is a perspective view of an electronic apparatus according to an exemplary embodiment.
Figure 8:
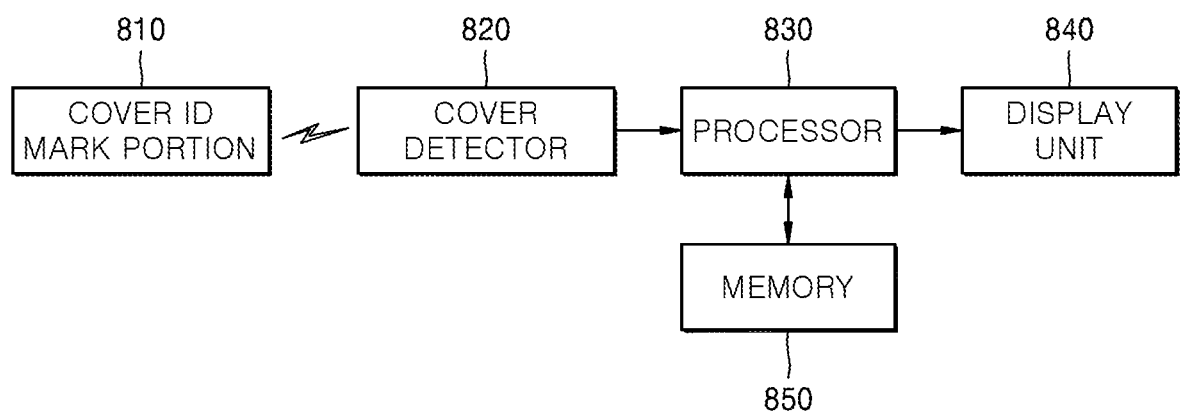
FIG. 8 is a block diagram of an electronic apparatus according to an exemplary embodiment.

FIG. 7 is a perspective view of an electronic apparatus according to an exemplary embodiment. FIG. 8 is a block diagram of an electronic apparatus according to an exemplary embodiment.

The configuration of an electronic apparatus according to an exemplary embodiment will be described with reference to FIGS. 7 and 8. The electronic apparatus is a combination of the mobile electronic apparatus described with reference to FIGS. 1 and 2 and the accessory device described with reference to FIG. 5.

The electronic apparatus may include a mobile electronic apparatus 700 and an accessory device 750.

The mobile electronic apparatus 700 may include a display unit 840 including a display screen 710, a cover detector 720 or 820, and a processor 730 or 830, and may further include a connecting portion 780.

The display unit 840 displays the execution results of a program executed by the processor 730 or 830 of the mobile electronic apparatus, and the display screen 710 is a display medium on which the execution results of a program driven by the processor 730 or 830 of the mobile electronic apparatus are displayed. Also, the display unit 840 displays a UI screen, which is generated by the execution of the program and corresponds to a cover, on the display screen 710.

When the display screen 710 is covered by a cover covering the mobile electronic apparatus (e.g., a smartphone), the cover detector 720 or 820 detects ID information of the cover.

When receiving the ID information of the cover detected by the cover detector 720 or 820, the processor 730 or 830 drives a program corresponding to the ID information.

Also, when the display screen 710 is not covered by the cover, for example, when the cover is opened to separate from the display screen 710, the processor 730 or 830 performs control such that the UI screen corresponding to the cover is not displayed on the display screen 710. Herein, a cover 760 may be formed of a transparent material. In the present exemplary embodiment, the cover 760 may be formed of any material that allows a displayed image to be shown to the user even when the display screen 710 is covered by the cover 760.

The cover detector 720 or 820 is generally a sensor and may be any other device that may detect the cover. The sensor senses a cover ID mark portion included in the cover. The cover ID mark portion may be, for example, a magnetic chip. The sensor may be, for example, a magnet sensor that senses the magnetic chip. The cover may be identified according to the positions, number, polarities, or sizes of magnets attached to the cover. When a plurality of magnets are installed or attached, the ID information of the cover may be discriminated according to the dispositions of the magnets.

In this case, when a signal of the sensor sensing the cover ID mark portion varies, the processor 730 or 830 detects another cover and drives another program corresponding to the signal.

Also, another example of the sensor may be an illuminance sensor that senses the cover ID mark portion on the basis of illuminance. In this case, the cover is identified according to the position of the cover ID mark portion attached to the cover.

Also, another example of the cover detector 720 or 820 may be an NFC detector. The NFC detector identifies the cover by detecting an NFC tag attached to the cover.

When the display screen 710 is covered by the cover, the processor 730 or 830 may connect to a server (not illustrated) located outside the mobile electronic apparatus, receive a program corresponding to the cover from the server, and install the received program in the mobile electronic apparatus. The server may be wirelessly connected to the mobile electronic apparatus through a network.

The mobile electronic apparatus according to the present exemplary embodiment may include the connecting portion 780. The connecting portion 780 physically connects the accessory device 750 and the mobile electronic apparatus 700.

The accessory device 750 may include a cover 760 and a cover ID mark portion 770, and may further include a connecting portion 780.

The cover 760 is to cover the display screen 710 of the mobile electronic apparatus 700. The cover 760 may be formed of a transparent material. In the present exemplary embodiment, the cover 760 may be formed of any material that allows a displayed image to be shown to the user even when the display screen 710 is covered by the cover 760.

A cover ID mark portion 810 may be attached to the cover 760, and may be identified by the cover detector 720 of the mobile electronic apparatus 700. The cover ID mark portion 810 may be sensed by a sensor embedded in the mobile electronic apparatus 700. The sensor may be, for example, a magnet sensor, an illuminance sensor, or a proximity sensor.

When the cover ID mark portion 770 or 810 is detected by a magnet sensor embedded in the mobile electronic apparatus 700, the cover ID mark portion 770 or 810 may be a magnetic chip sensed by the magnet sensor. The ID information of the accessory device 750 may be discriminated according to the positions, number, polarities, or sizes of magnets attached to the cover 760. When a plurality of magnets are installed or attached, the ID information of the cover may be discriminated according to the dispositions of the magnets.

Also, the cover ID mark portion 770 or 810 may be detected by an illuminance sensor embedded in the mobile electronic apparatus 700. In this case, the cover ID mark portion 770 or 810 may be sensed by the illuminance sensor, and the ID information of the accessory device 750 may be discriminated according to the position of the cover ID mark portion 770 or 810 attached to the accessory device 750.

Also, the cover ID mark portion 770 or 810 may be detected by an NFC detector embedded in the mobile electronic apparatus 700. In this case, the cover ID mark portion 770 or 810 may be an NFC tag, and the accessory device 750 may be identified by reading the NFC tag by the NFC detector.

When the display screen 710 of the mobile electronic apparatus (e.g., a smartphone) is covered by the accessory device 750, a UI screen corresponding to the cover ID mark portion 770 or 810 is displayed on the display screen 710 of the smartphone. For example, when the cover 760 covers the smartphone, the cover 760 may be identified by sensing a magnet of the cover ID mark portion 770 or 810 by a magnet sensor embedded in the smartphone, a program corresponding to the identified cover 760 may be executed, and an execution result, for example, a UI screen may be displayed on the display screen 710 of the smartphone.

The accessory device 750 may include a button portion (not illustrated). The button portion may be embossed in a predetermined region of the accessory device 750 to provide a touch feel corresponding to a key input when the user presses the embossed button portion.

The accessory device 750 may include the connecting portion 780. The connecting portion 780 may connect the mobile electronic apparatus 700 (e.g., a smartphone) and the accessory device 750 to attach the accessory device 750 to the smartphone 700.

Figure 9:
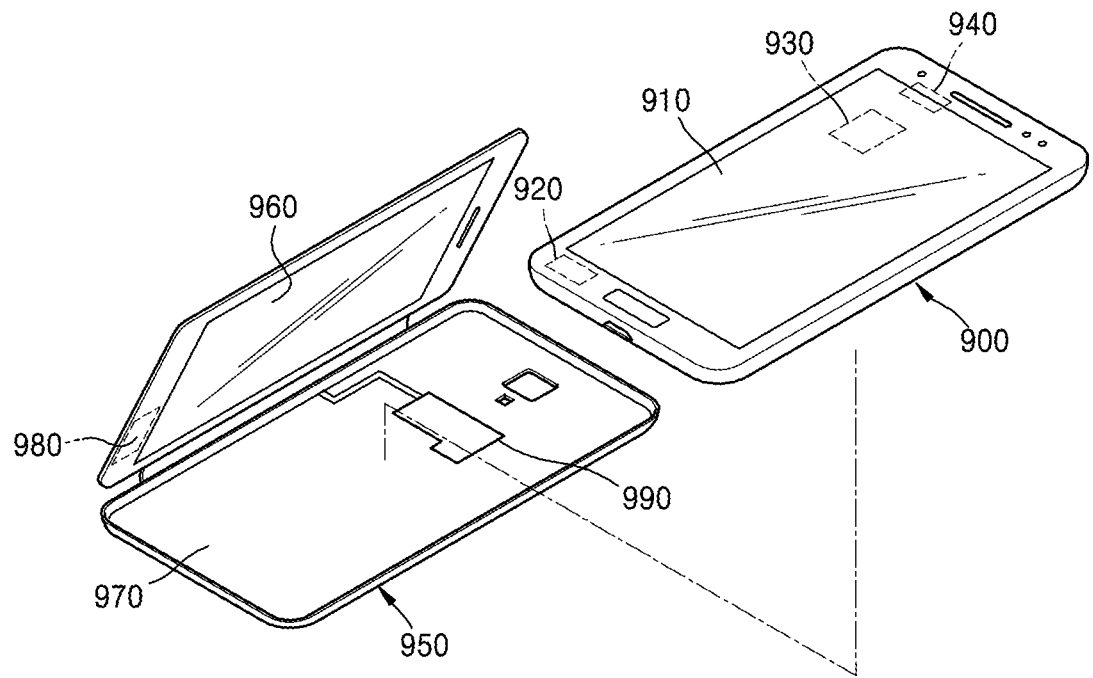
FIG. 9 is a perspective view of an electronic apparatus according to another exemplary embodiment.
Figure 10:
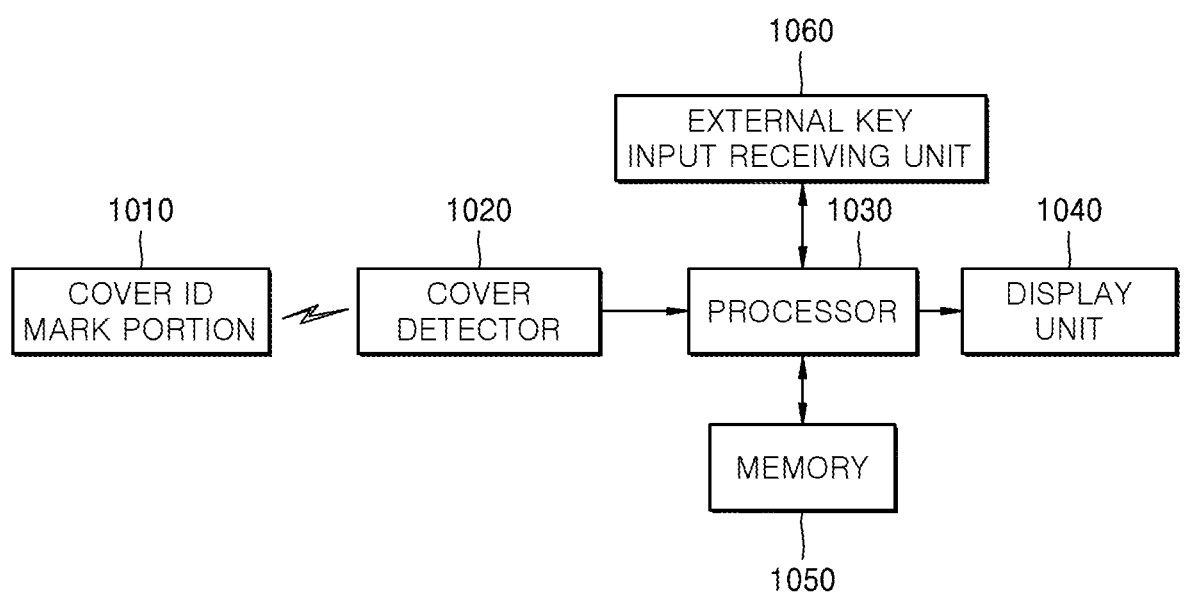
FIG. 10 is a block diagram of an electronic apparatus according to another exemplary embodiment.

FIG. 9 is a perspective view of an electronic apparatus according to another exemplary embodiment. FIG. 10 is a block diagram of an electronic apparatus according to another exemplary embodiment.

The configuration of an electronic apparatus according to another exemplary embodiment will be described with reference to FIGS. 9 and 10. The electronic apparatus is a combination of the mobile electronic apparatus described with reference to FIGS. 3 and 4 and the accessory device described with reference to FIGS. 6A and 6B.

The electronic apparatus may include a mobile electronic apparatus 900 and an accessory device 950.

The mobile electronic apparatus 900 may include a display unit 1040 including a display screen 910, a cover detector 920 or 1020, and a processor 930 or 1030, and may further include an external key input receiving unit 940 or 1060.

The accessory device 950 may include a display cover 960, a battery cover 970, and a cover ID mark portion 980, and may further include a connector 990.

The display unit 1040 displays the execution results of a program executed by the processor 930 or 1030, and the display screen 910 is a display medium on which the execution results of a program driven by the processor 930 or 1030 are displayed.

When the display screen 910 is covered by the display cover 960 covering the mobile electronic apparatus (e.g., a smartphone), the cover detector 920 or 1020 detects ID information of the cover.

The display cover 960 of the accessory device 950 covers the display screen of the mobile electronic apparatus 900, and the battery cover 970 is attached to the rear side of the mobile electronic apparatus 900 to cover the battery of the mobile electronic apparatus 900.

A memory or a magnet may be attached to the battery cover 970, and the cover detector 920 may detect ID information of the accessory device 950 by using the memory or the magnet attached to the battery cover 970.

When the display screen 910 of the smartphone is covered by the display cover 960, the processor 930 or 1030 executes a program corresponding to the ID information of the accessory device 950 detected by the cover detector 920. When the program is executed, the display unit 1040 displays a UI screen corresponding to the accessory device 950 on the display screen 910. On the other hand, when the display screen 910 is not covered by the accessory device 950, for example, when the display screen 910 is uncovered after being covered by the accessory device 950, the UI screen corresponding is not displayed on the display screen 910.

The external key input receiving unit 940 receives an external key input from an external key input unit (not illustrated) installed in the display cover 960 of the accessory device 950. The accessory device 950 may include the connector 990. The accessory device 950 may be electrically connected to the mobile electronic apparatus 900 by the connector 990, and the external key input unit may receive power supply through the connector 990.

The display cover 960 of the accessory device 950 may include a cover ID mark portion for identification of the accessory device 950. The cover detector 920 or 1020 detects the cover ID mark portion 980 of the accessory device 950. The cover detector 920 or 1020 may include a sensor embedded in the mobile electronic apparatus 900 and may detect the cover ID mark portion 980 of the accessory device 950 through the sensor.

The cover ID mark portion 980 of the accessory device 950 may be, for example, a magnetic chip, and the sensor may be, for example, a magnet sensor that senses the magnetic chip. The accessory device 950 may be identified according to the positions, number, polarities, or sizes of magnets attached to the cover. When a plurality of magnets are installed or attached, the ID information of the cover may be discriminated according to the dispositions of the magnets.

In this case, when a signal of the sensor sensing the cover ID mark portion 980 of the accessory device 950 varies, the processor 930 or 1030 detects another accessory device 950 and drives another program corresponding to the signal. Also, another example of the sensor may be an illuminance sensor that senses the cover ID mark portion on the basis of illuminance. In this case, the accessory device 950 may be identified according to the position of the cover ID mark portion 980 attached to the accessory device 950.

Also, another example of the cover detector 920 or 1020 may be an NFC detector. The NFC detector identifies the cover by detecting an NFC tag attached to the cover.

A memory may be attached to the battery cover 970 of the accessory device 950, and a program, which may be executed by the processor 930 or 1030 of the mobile electronic apparatus 900, may be stored in the memory. When the display cover 960 covers the display screen 910 of the mobile electronic apparatus (e.g., a smartphone), the program stored in the memory attached to the battery cover 970 may be executed by the processor 930 or 1030. Also, when the battery cover and the mobile electronic apparatus are electrically connected by the connector or the like, the program stored in the memory attached to the battery cover 970 may be installed in a memory 1050 embedded in the mobile electronic apparatus 900.

The accessory device 950 may include the display cover 960, the battery cover 970, and the cover ID mark portion 980.

The display cover 960 covers the display screen 910 of the mobile electronic apparatus (e.g., a smartphone). The battery cover 970 covers the bottom side of the mobile electronic apparatus (e.g., a smartphone) at which the battery is installed. The display cover 960 and the battery cover 970 are united together.

The display cover 960 may include a button-type external key input unit (not illustrated). When the user inputs a key through the external key input unit, the key input is transmitted to the mobile electronic apparatus.

The cover ID mark portion 980 or 1010 may include an ID mark for identification of the accessory device 950, and may be disposed in the display cover 960 or the battery cover 970. The cover ID mark portion 980 may be, for example, a magnetic chip that may be sensed by a magnet sensor. The accessory device may be identified according to the positions, number, polarities, or sizes of magnets attached to the display cover 960. When a plurality of magnets are installed or attached, the ID information of the cover may be discriminated according to the dispositions of the magnets.

Another example of the cover ID mark portion 980 or 1010 may be an NFC tag that may be detected by an NFC detector. The NFC detector identifies the accessory device 950 by detecting an NFC tag attached to the display cover 960.

When the display screen 910 of the mobile electronic apparatus 900 (e.g., a smartphone) is covered by the display cover 960, the smartphone detects the cover ID mark portion 980 and executes a program corresponding to the detected cover ID mark portion 980 to display a UI screen on the display screen.

Referring to FIG. 9, the battery cover 970 may include a connector 990 and an external key input unit. The external key input unit and the connector 990 are connected to an SD card slot (not illustrated) included in the mobile electronic apparatus 900. The external key input unit may have a button shape and may be embodied by using a PCB. When the SD card slot and the connector 990 are connected to each other, the external key input unit may receive power supply through the connector 990 to supply power to the PCB of the external key input unit. The external key input unit may be disposed in a region other than the top region of a display cover 960.

A memory (not illustrated) may be attached to the battery cover 970 of the accessory device 950, and a program, which may be executed by the mobile electronic apparatus 900, may be stored in the memory. When the display cover 960 covers the display screen 910 of the mobile electronic apparatus 900 (e.g., a smartphone), the program stored in the memory attached to the battery cover 970 may be executed by the processor 930 or 1030 embedded in the smartphone. Also, the program stored in the memory attached to the battery cover 970 may be installed in the memory 1050 embedded in the mobile electronic apparatus 900.

The cover detector 130, 210, 320, 410, 720, 820, or 920 may be, for example, an illuminance sensor. An example of a method for identifying the cover by the illuminance sensor will be described below. The cover includes the cover ID mark portion 520, 630, 690, 770, 810, 980, or 1010 for identification of the cover. The cover detector 130, 210, 320, 410, 720, 820, or 920 may be installed in the mobile electronic apparatus according to the present exemplary embodiment. When the display screen 110, 300, 710, or 910 of the mobile electronic apparatus is covered by the cover, the cover ID mark portion 520, 630, 690, 770, 810, 980, or 1010 is detected by the illuminance sensor to identify the cover of each type. That is, for example, the cover may be identified as a cover for a game, a cover for a social network service (SNS), or a cover for an old person. Herein, when the display screen 110, 300, 710, or 910 of the mobile electronic apparatus is covered by the cover, the cover ID mark portion 520, 630, 690, 770, 810, 980, or 1010 and the illuminance sensor may be located to face each other.

Figure 21:
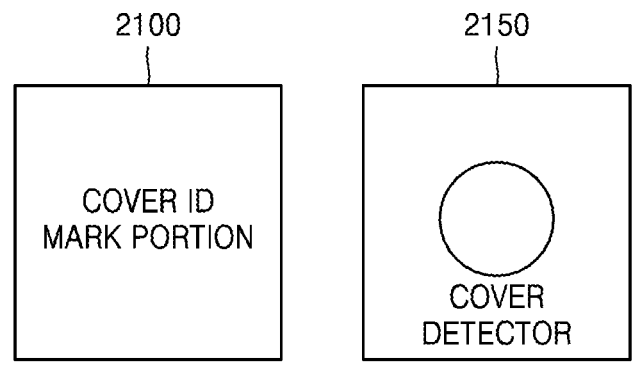
FIG. 21 illustrates a cover identification (ID) mark portion and a cover detector.
Figure 22A:
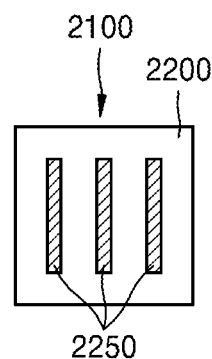
FIGS. 22A to 22C illustrate various exemplary shapes of a cover ID mark portion included in a cover.
Figure 22B:
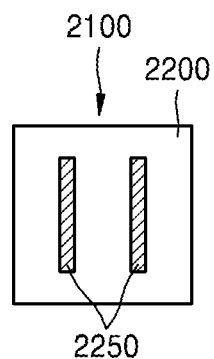
Figure 22C:
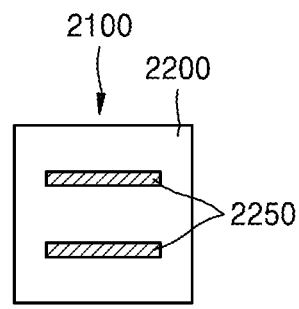

Since the illuminance sensor detects the amount of input light, when the cover ID mark portion 520, 630, 690, 770, 810, 980, or 1010 is located at the illuminance sensor, the amount of light input through the cover ID mark portion 520, 630, 690, 770, 810, 980, or 1010 varies according to cover types. FIG. 21 illustrates a cover ID mark portion 2100 and a cover detector 2150. Also, FIG. 22 illustrates various exemplary shapes of the cover ID mark portion 520, 630, 690, 770, 810, 980, 1010, or 2100 included in the cover. Referring to FIG. 22, the cover ID mark portion 520, 630, 690, 770, 810, 980, 1010, or 2100 may include a transparent material 2200 and a pattern 2250 of an opaque material formed in the transparent material 2200. Thus, the cover ID mark portion 520, 630, 690, 770, 810, 980, 1010, or 2100 includes opaque patterns of various shapes, and the illuminance sensor senses the cover ID mark portion 520, 630, 690, 770, 810, 980, 1010, or 2100 by different amounts of light according to the patterns.

Also, the cover may be identified by using a camera instead of the illuminance sensor. The cover detector 130, 210, 320, 410, 720, 820, or 920 may be, for example, a camera. An example of a method for identifying the cover by the camera will be described below. The cover includes the cover ID mark portion 520, 630, 690, 770, 810, 980, 1010, or 2100 for identification of the cover. A camera may be installed in the mobile electronic apparatus according to the present exemplary embodiment. When the display screen 110, 300, 710, or 910 of the mobile electronic apparatus is covered by the cover, an image of the cover ID mark portion 520, 630, 690, 770, 810, 980, 1010, or 2100 is captured by the camera to identify the cover. That is, for example, the cover may be identified as a cover for a game, a cover for an SNS, or a cover for an old person. Herein, when the display screen 110, 300, 710, or 910 of the mobile electronic apparatus is covered by the cover, the cover ID mark portion 520, 630, 690, 770, 810, 980, 1010, or 2100 and the camera may be located to face each other.

When the cover ID mark portion 520, 630, 690, 770, 810, 980, 1010, or 2100 is located at the camera, since the camera captures an image of the cover ID mark portion 520, 630, 690, 770, 810, 980, 1010, or 2100, the cover ID mark portion 520, 630, 690, 770, 810, 980, 1010, or 2100 may be detected differently according to cover types by using the captured image.

The cover ID mark portion 520, 630, 690, 770, 810, 980, 1010, or 2100 included in the cover may have the same shape as that illustrated in FIG. 22. However, when the cover ID mark portion 520, 630, 690, 770, 810, 980, 1010, or 2100 may be detected differently by the camera, the cover ID mark portion 520, 630, 690, 770, 810, 980, 1010, or 2100 may have a different shape from that illustrated in FIG. 22.

Also, the cover may be identified by using a proximity sensor. That is, the cover detector 130, 210, 320, 410, 720, 820, or 920 may be, for example, a proximity sensor. An example of a method for identifying the cover by the proximity sensor will be described below.

The cover includes the cover ID mark portion 520, 630, 690, 770, 810, 980, 1010, or 2100 for identification of the cover. A proximity sensor may be installed in the mobile electronic apparatus according to the present exemplary embodiment. When the display screen 110, 300, 710, or 910 of the mobile electronic apparatus is covered by the cover, the cover ID mark portion 520, 630, 690, 770, 810, 980, 1010, or 2100 is sensed by the proximity sensor to identify the cover. That is, for example, the cover may be identified as a cover for a game, a cover for an SNS, or a cover for an old person.

Thus, in order to identify the cover, a plurality of proximity sensors may be used and the cover type may vary according to the number of proximity sensors. FIGS. 23A to 23D are plan views illustrating examples of detecting a cover by using two proximity sensors. FIGS. 24A to 24D are perspective views illustrating examples of detecting a cover by using two proximity sensors in an electronic apparatus 2300 according to an exemplary embodiment.

Figure 23A:
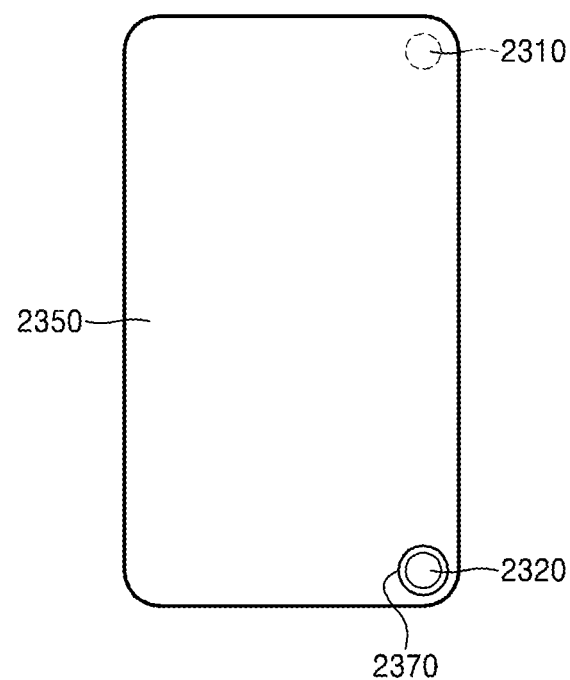
FIGS. 23A to 23D are plan views illustrating examples of detecting a cover by using two proximity sensors.
Figure 23B:
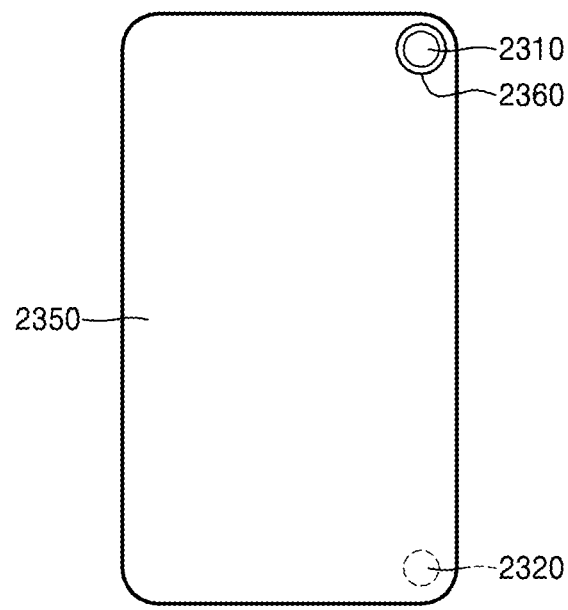
Figure 23C:
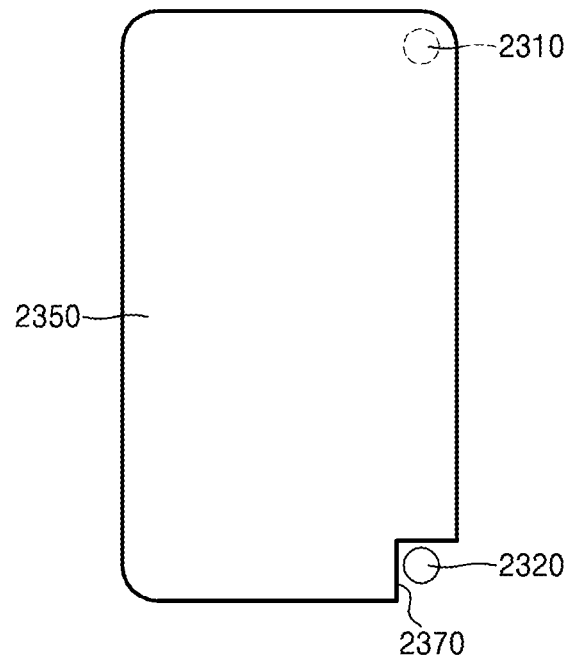

Referring to FIGS. 23A to 23D and FIGS. 24A to 24D, a first proximity sensor 2310 and a second proximity sensor 2320 are installed in a mobile electronic apparatus (e.g., a smartphone). Referring to FIGS. 23A and 23C, a cover 2350 is sensed by the first proximity sensor 2310 since the cover 2350 covers the first proximity sensor 2310, but the cover 2350 is not sensed by the second proximity sensor 2320 since the cover 2350 does not cover the second proximity sensor 2320.

In this way, the first proximity sensor 2310 generates a first proximity signal since the cover 2350 approaches the first proximity sensor 2310, but the second proximity sensor 2320 does not generate a second proximity signal since the cover 2350 does not cover the second proximity sensor 2320. Therefore, the cover is identified by a combination of output signals of the first proximity signal and the second proximity signal.

Figure 23D:
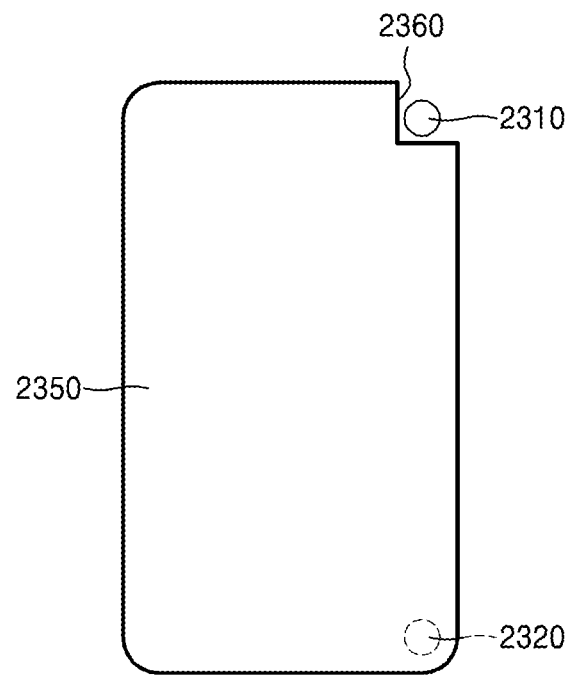
Figure 24A:
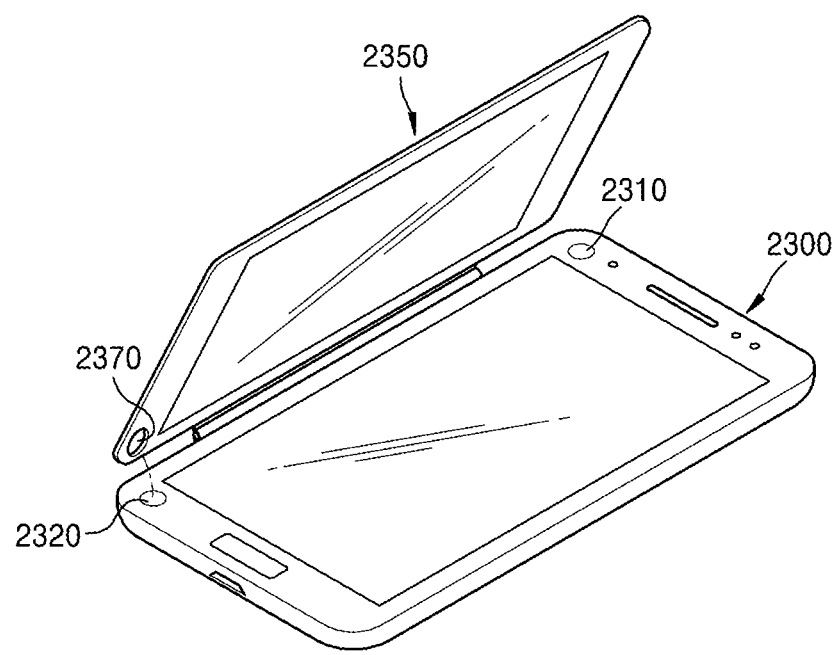
FIGS. 24A to 24D are perspective views illustrating examples of detecting a cover by using two proximity sensors in an electronic apparatus according to an exemplary embodiment.
Figure 24B:
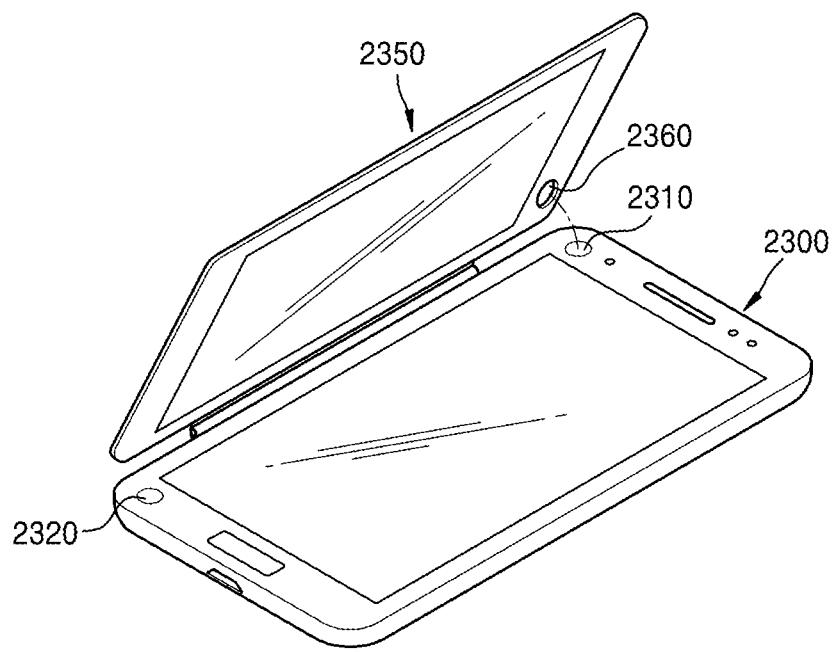
Figure 24C:
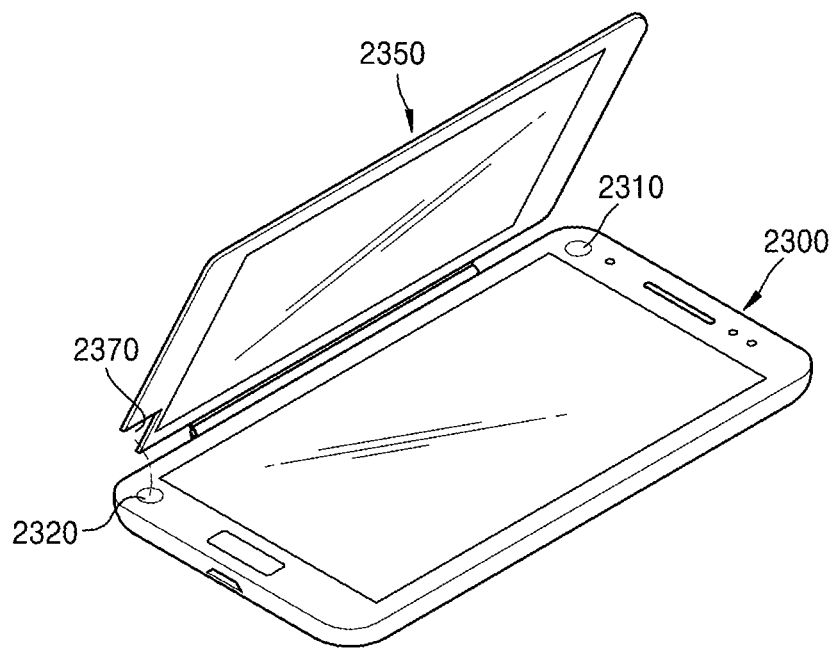
Figure 24D:
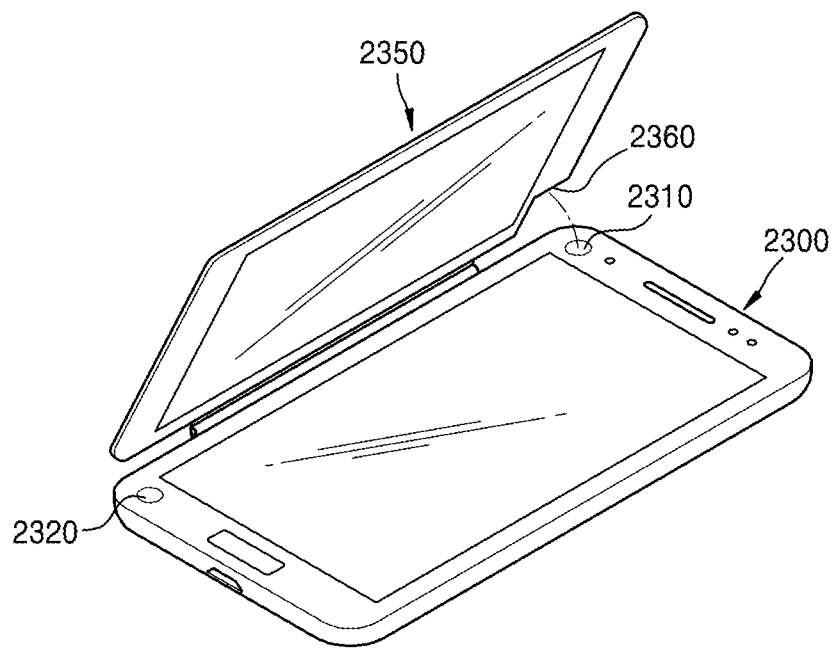

Likewise, referring to FIGS. 23A to 23D and FIGS. 24A to 24D, a first proximity sensor 2310 and a second proximity sensor 2320 are installed in a mobile electronic apparatus (e.g., a smartphone). Referring to FIGS. 23B and 23D, a cover 2350 is sensed by the second proximity sensor 2320 since the cover 2350 covers the second proximity sensor 2320, but the cover 2350 is not sensed by the first proximity sensor 2310 since the cover 2350 does not cover the first proximity sensor 2310. In this way, the second proximity sensor 2320 generates a second proximity signal since the cover 2350 approaches the second proximity sensor 2320, but the first proximity sensor 2310 does not generate a first proximity signal since the cover 2350 does not cover the first proximity sensor 2310. Therefore, the cover is identified by a combination of output signals of the first proximity signal and the second proximity signal.

Herein, when the display screen 110, 300, 710, or 910 of the mobile electronic apparatus is covered by the cover, the cover ID mark portion 520, 630, 690, 770, 810, 980, 1010, or 2100 and the proximity sensor 2310 or 2320 may be located to face each other.

Although FIGS. 23A to 23D and FIGS. 24A to 24D illustrate an example of using two proximity sensors, three or more proximity sensors may be used. As the number of proximity sensors, the number of identifiable cover types increases. While four types of covers may be identified by two proximity sensors, 16 types of covers may be identified by four proximity sensors.

Figure 11:
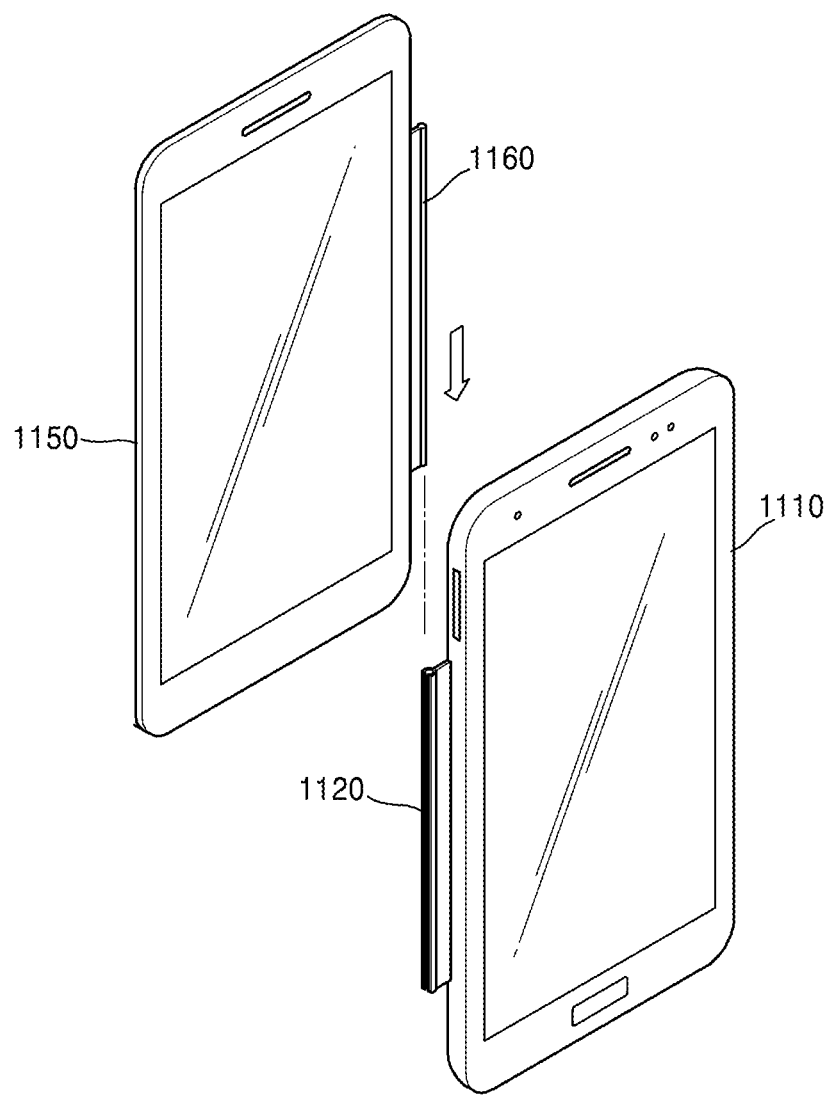
FIG. 11 illustrates an example in which a connecting portion of the mobile electronic apparatus illustrated in FIG. 1 and a connecting portion of the accessory device illustrated in FIG. 5 are connected to each other.
Figure 12:
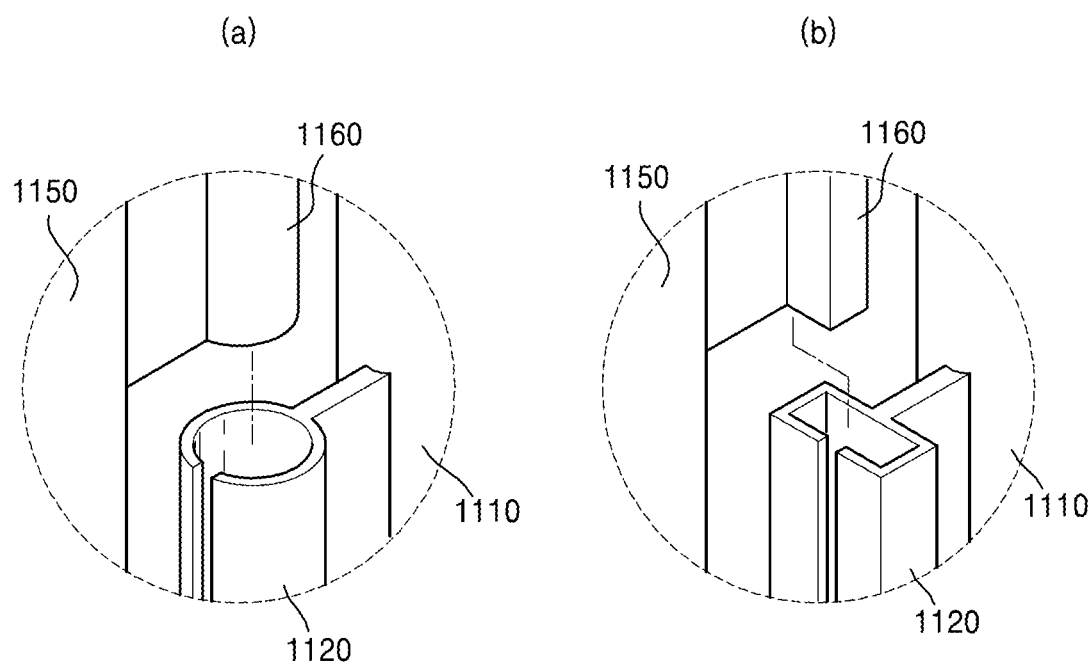
FIG. 12 illustrates an exemplary structure in which the connecting portion of the mobile electronic apparatus and the connecting portion of the accessory device illustrated in FIG. 11 are physically coupled without an electrical device by moving in a vertical direction.

FIG. 11 illustrates an example in which the connecting portion 140 of the mobile electronic apparatus illustrated in FIG. 1 and the connecting portion 530 of the accessory device illustrated in FIG. 5 are connected to each other. Referring to FIG. 11, a connecting portion 1120 of a mobile electronic apparatus 1110 and a connecting portion 1160 of an accessory device 1150 may be physically coupled without an electrical device. That is, when the accessory device 1150 is connected to the mobile electronic apparatus 1110, the accessory device 1150 is physically coupled with the mobile electronic apparatus 1110 by moving in a vertical direction without having electrical components installed therein. FIGS. 12A and 12B illustrate an exemplary structure in which the connecting portion 1120 of the mobile electronic apparatus 1110 and the connecting portion 1160 of the accessory device 1150 illustrated in FIG. 11 are physically coupled without an electrical device by moving in a vertical direction. FIG. 12A illustrates a cylindrical coupling structure, and FIG. 12B illustrates a tetragonal coupling structure. The connecting portion 1120 of the mobile electronic apparatus 1110 and the connecting portion 1160 of the accessory device 1150 may be coupled in various other ways.

Figure 13:
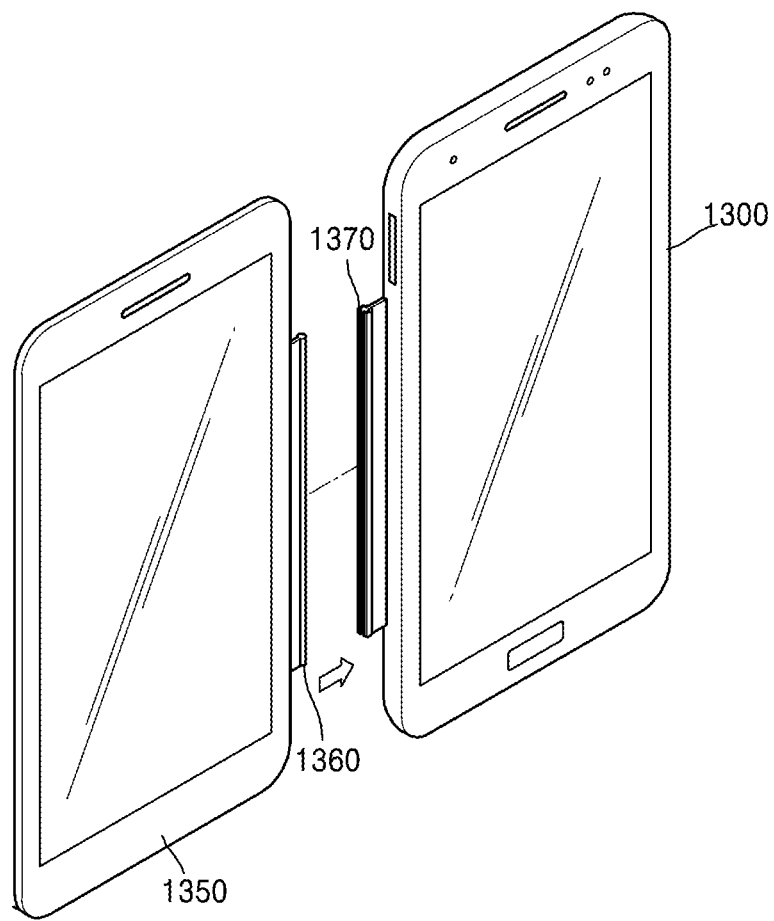
FIG. 13 illustrates another example in which the connecting portion of the mobile electronic apparatus illustrated in FIG. 1 and the connecting portion of the accessory device illustrated in FIG. 5 are connected to each other.
Figure 14:
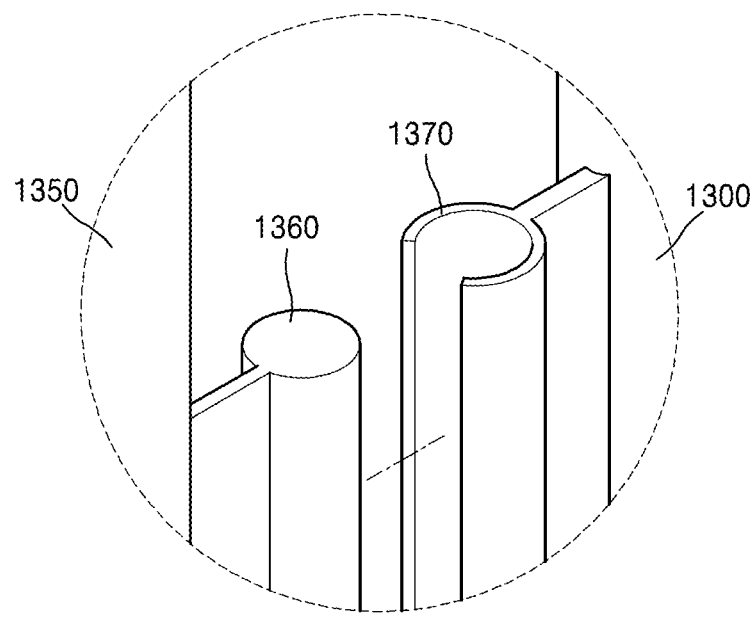
FIG. 14 illustrates an exemplary structure in which the connecting portion of the mobile electronic apparatus and the connecting portion of the accessory device illustrated in FIG. 13 are physically coupled without an electrical device by moving in a horizontal direction.

FIG. 13 illustrates another example in which the connecting portion 140 of the mobile electronic apparatus illustrated in FIG. 1 and the connecting portion 530 of the accessory device illustrated in FIG. 5 are connected to each other. Referring to FIG. 13, a connecting portion 1370 of a mobile electronic apparatus 1300 and a connecting portion 1360 of an accessory device 1350 may be physically coupled without an electrical device. That is, when the accessory device 1350 is connected to the mobile electronic apparatus 1300, the accessory device 1350 is physically coupled with the mobile electronic apparatus 1300 by moving in a vertical direction, without having electrical components installed therein. FIG. 14 illustrates an exemplary structure in which the connecting portion 1370 of the mobile electronic apparatus 1300 and the connecting portion 1360 of the accessory device 1350 illustrated in FIG. 13 are physically coupled without an electrical device by moving in a horizontal direction. The connecting portion 1370 of the mobile electronic apparatus 1300 and the connecting portion 1360 of the accessory device 1350 may be coupled in various other ways.

Figure 15:
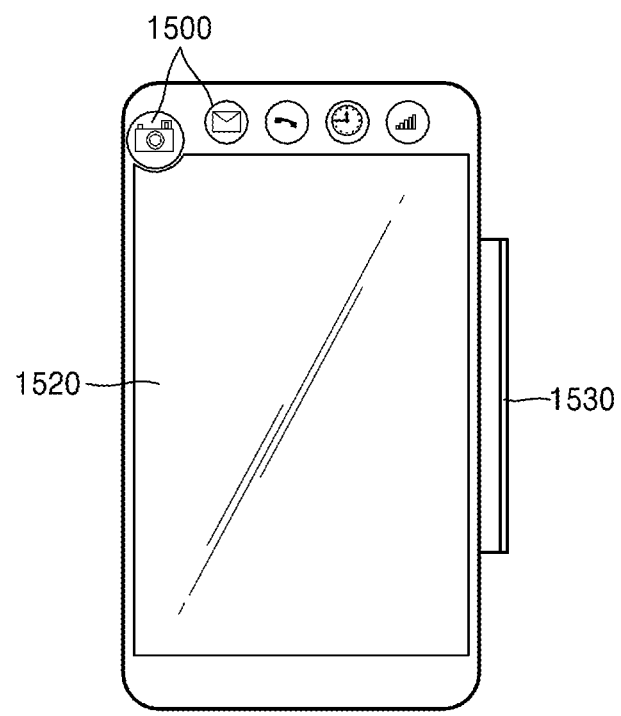
FIG. 15 illustrates an example of an accessory device for a mobile electronic apparatus according to an exemplary embodiment.

FIG. 15 illustrates an example of an accessory device for a mobile electronic apparatus according to an exemplary embodiment. Herein, the accessory device includes a transparent cover 1520, printed and embossed buttons 1500, and a connecting portion 1530.

Figure 16:
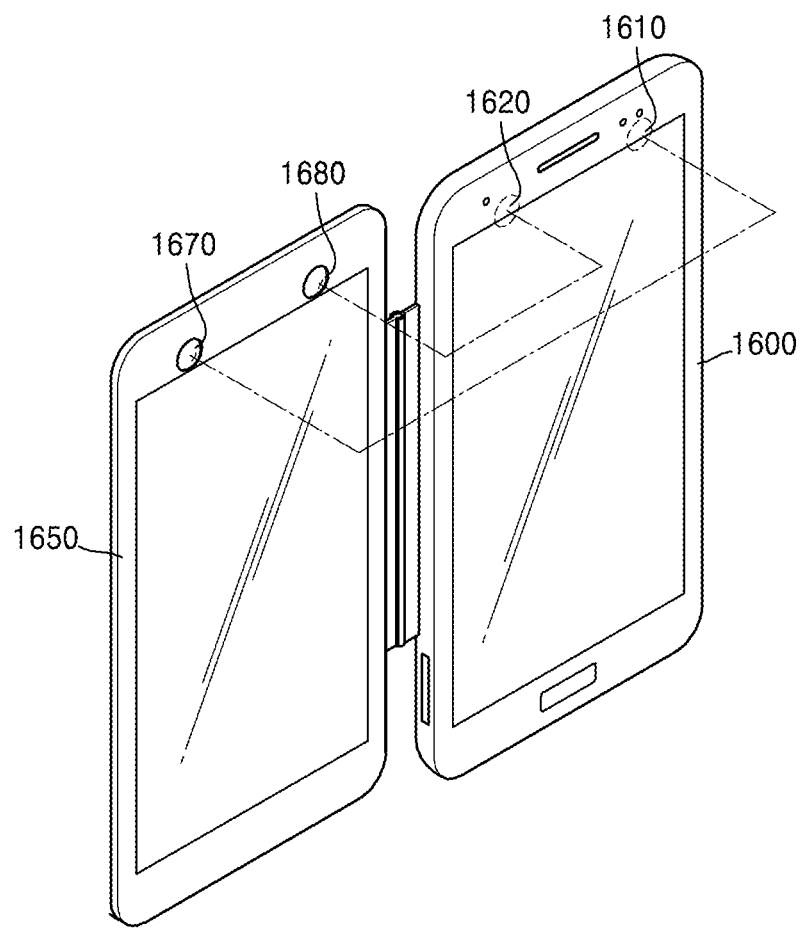
FIG. 16 illustrates an example of an electronic apparatus including a mobile electronic apparatus and an accessory device coupled together according to an exemplary embodiment.

FIG. 16 illustrates an example of an electronic apparatus including a mobile electronic apparatus 1600 and an accessory device 1650 coupled together according to an exemplary embodiment. Herein, when the user presses a button 1670 or 1680 of the accessory device 1650 with a finger or the like, a physical force is applied thereto. Therefore, since a button portion of the cover of the accessory device 1650 is deformed and the finger of the user approaches a touchscreen of the mobile electronic apparatus 1600, a touch 1620 or 1610 may be input and the button may be pressed without an electrical/physical device. Also, when the button portion of the cover is changed, the user may have a feel as if a physical key input is performed differently from a touch input.

Figure 17:
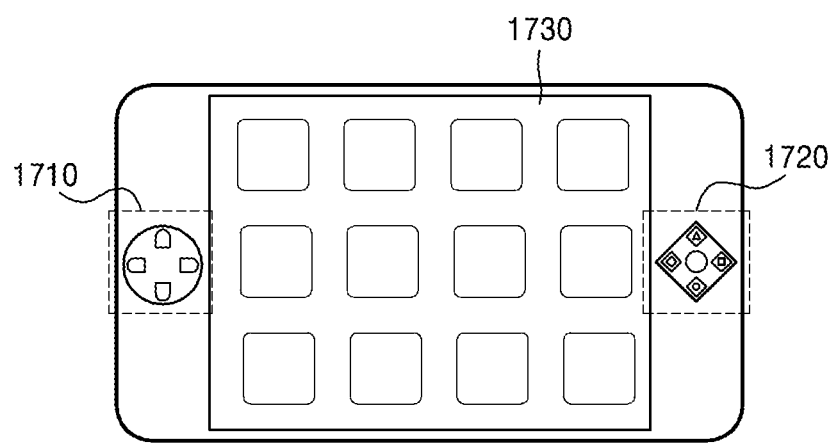
FIG. 17 illustrates an accessory device for a game as an example of an accessory device for a mobile electronic apparatus according to an exemplary embodiment.

FIG. 17 illustrates an accessory device for a game as an example of an accessory device for a mobile electronic apparatus according to an exemplary embodiment. Referring to FIG. 17, a mechanical direction key 1710, a button key 1720, and a UI screen 1730 are illustrated. The UI screen 1730 is a UI screen for a game when the accessory device is attached to the mobile electronic apparatus and thus the display screen of the mobile electronic apparatus is covered by the cover.

Figure 18:
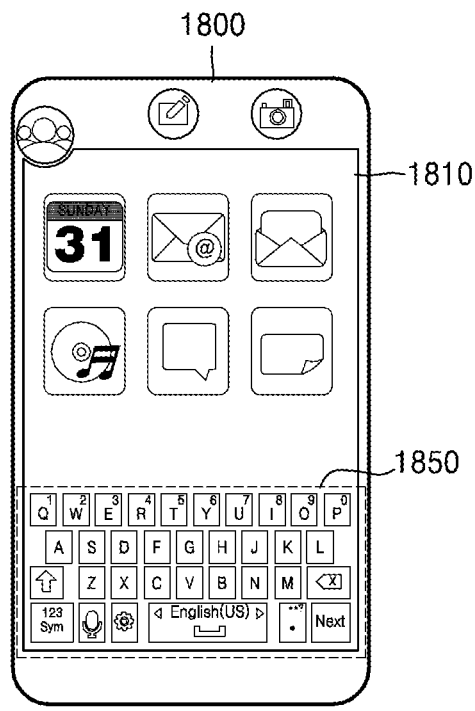
FIG. 18 illustrates an accessory device for a social network service (SNS) as an example of an accessory device for a mobile electronic apparatus according to an exemplary embodiment.

FIG. 18 illustrates an accessory device 1800 for an SNS as an example of an accessory device for a mobile electronic apparatus according to an exemplary embodiment. Referring to FIG. 18, a UI screen 1810 and a mechanical keyboard 1850 is installed for the use of an SNS. The UI screen 1810 is a UI screen for an SNS when the accessory device 1800 is attached to the mobile electronic apparatus and thus the display screen of the mobile electronic apparatus is covered by the cover.

By using the game accessory device and the SNS accessory device of FIGS. 17 and 18, the user may feel a clear key input when the user has to feel a sure physical key input touch sense.

Figure 19:
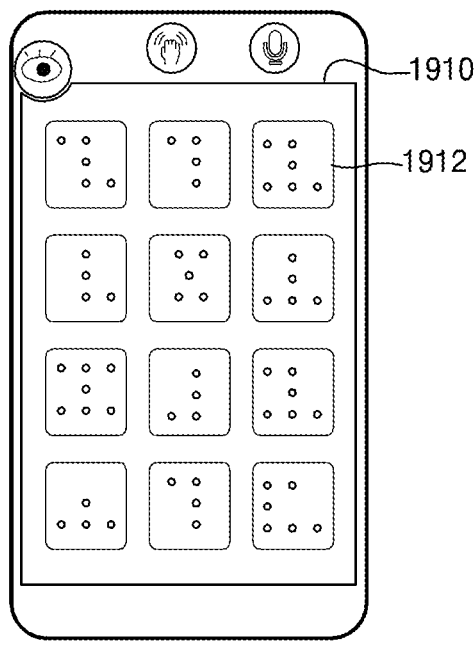
FIG. 19 illustrates an accessory device for a visually handicapped person as an example of an accessory device for a mobile electronic apparatus according to an exemplary embodiment.

FIG. 19 illustrates an accessory device for a visually handicapped person as an example of an accessory device for a mobile electronic apparatus according to an exemplary embodiment. Referring to FIG. 19, when a button 1912 is braille-processed and a button portion 1910 is pressed down, a predetermined region of a display screen of the mobile electronic apparatus may be touched and an application of the mobile electronic apparatus may execute various inputs according to the touch of the predetermined region.

Figure 20A:
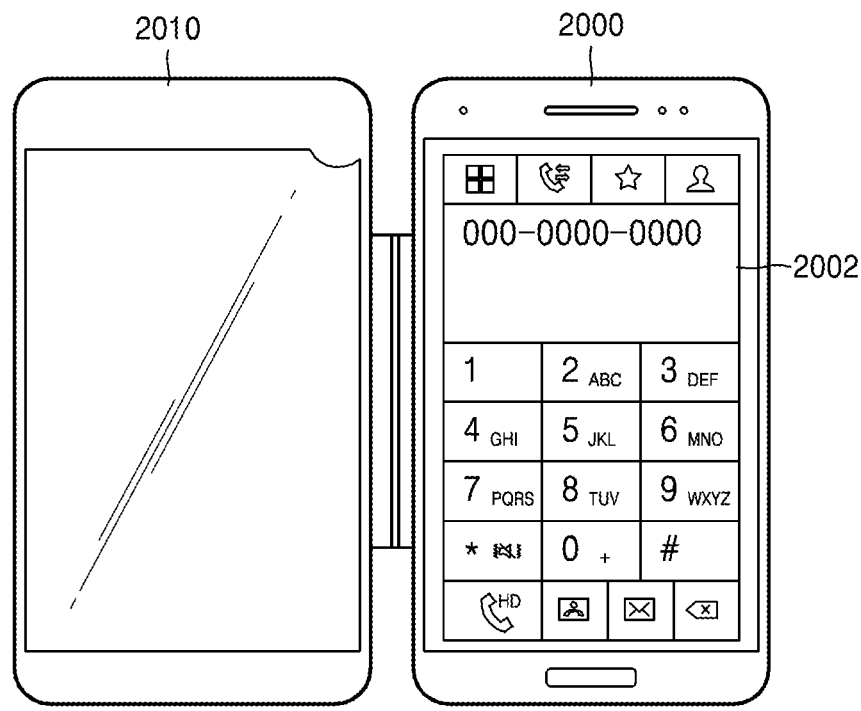
FIGS. 20A and 20B illustrate an accessory device for an old person as an example of an accessory device for a mobile electronic apparatus according to an exemplary embodiment.
Figure 20B:
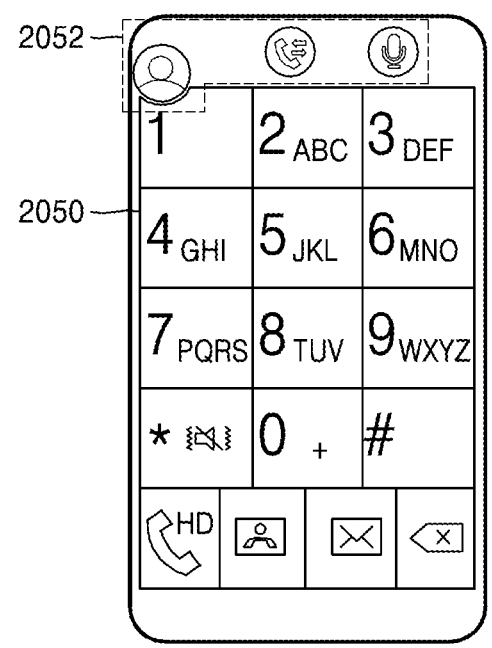

FIG. 20 illustrates an accessory device 2010 for an old person as an example of an accessory device for a mobile electronic apparatus according to an exemplary embodiment. FIG. 20A illustrates a state in which an accessory device 2010 does not cover a mobile electronic apparatus 2000, and FIG. 20B illustrates a state in which the accessory device 2010 covers the mobile electronic apparatus 2000. A reference numeral "2002" denotes a display screen of the mobile electronic apparatus 2000 when the accessory device 2010 does not cover the mobile electronic apparatus 2000. When the accessory device 2010 covers the mobile electronic apparatus 2000, a UI screen 2050 with enlarged numerals is displayed. An embossed menu key 2052 is provided by the accessory device.

When the accessory device according to an exemplary embodiment is used with its cover opened, a general function of the mobile electronic apparatus is performed. When the cover is closed, the ID information of the cover is read to perform an application or function corresponding to the read ID information. Also, when the ID information of the accessory device is read with the accessory device connected to the mobile electronic apparatus, various internal configurations of the mobile electronic apparatus may be set according to the read ID information. For example, when a cover for an old person is closed, an application of the accessory device is first performed.

Then, when the cover of the accessory device is opened, the internal configurations (e.g., a font, a color, and a style of type) of the mobile electronic apparatus may be automatically converted according to the stored ID information to provide a relevant function to the user.

The foregoing is illustrative of exemplary embodiments and is not to be construed as limiting thereof. Although the exemplary embodiments have been described above, those of ordinary skill in the art will readily appreciate that various modifications are possible in the exemplary embodiments without materially departing from the concepts and features of the exemplary embodiments. Therefore, it is to be understood that the exemplary embodiment described above should be considered in a descriptive sense only and not for purposes of limitation. For example, elements described as being combined may also be implemented in a distributed manner, and elements described as being distributed may also be implemented in a combined manner.

Therefore, the scope of the inventive concept is defined not by the detailed description of the exemplary embodiments but by the appended claims, and all modifications or differences within the scope should be construed as being included in the inventive concept.

It should be understood that the exemplary embodiments described herein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope of the inventive concept as defined by the following claims.

The invention claimed is:

1. A mobile electronic apparatus comprising:
    a display unit including a display screen;
    a first sensor and a second sensor configured to obtain identification (ID) information of a cover by detecting a cover identification (ID) mark portion included in the cover, when the display screen is covered by the cover; and
    a processor performing control such that a user interface (UI) screen corresponding to the cover is displayed on the display screen, by driving a first program corresponding to the obtained ID information of the cover,
    wherein the processor is configured to execute a second program to perform a general function of the mobile electronic apparatus based on the cover being opened, and execute the first program to perform a function corresponding to the ID information of the cover, that is read from the cover, based on the cover being closed, and wherein the ID information of the cover is discriminated according to a combination of output signals of the first sensor and the second sensor, the output signals being different based on at least one of a position, a number, and a size of the cover ID mark portion, and a type of graphic user interface, among a plurality of types of graphic interfaces, to be displayed is uniquely identified based on the ID information when the respective cover is fully closed.

2. The mobile electronic apparatus of claim 1, wherein when the display screen is not covered by the cover, the processor performs control such that the UI screen corresponding to the cover is not displayed on the display screen.

3. The mobile electronic apparatus of claim 2, wherein the the first sensor and the second sensor sense the cover ID mark portion included in the cover.

4. The mobile electronic apparatus of claim 3, wherein when the output signals of the first sensor and the second sensor sensing the cover ID mark portion vary, the processor drives the first program corresponding to the output signals, and wherein when a captured image of the cover ID mark portion captured by a camera varies, the processor drives the first program corresponding to the image and the cover is identified according to the captured image.

5. The mobile electronic apparatus of claim 4, wherein the first sensor and the second sensor are one of magnet sensors sensing a magnetic chip corresponding to the cover ID mark portion, illuminance sensors sensing the cover ID mark portion on a basis of illuminance, and proximity sensors sensing a proximity of the cover, when the first sensor and the second sensor are the magnet sensors, the cover is identified differently according to positions, number, polarities, or sizes of magnets attached to the cover, when the first sensor and the second sensor are the illuminance sensors, the cover is identified according to the position of the cover ID mark portion attached to the cover, and when the first sensor and the second sensor are the proximity sensors, the cover is identified according to whether the cover is sensed by each of one or more proximity sensors.

6. The mobile electronic apparatus of claim 1, wherein when the display screen is covered by the cover, the processor connects to a server, receives the first program corresponding to the cover from the server, and installs the received first program.

7. The mobile electronic apparatus of claim 1, wherein the ID information of the cover uniquely identifies a type of the cover.

8. The mobile electronic apparatus of claim 1, wherein the processor is further configured to:

differentiate between a plurality of covers based on the output signals of the first sensor and the second sensor, identify one of a gaming cover or a social network service cover, among the plurality of covers, bases on the output signals of the first sensor and the second sensor, and display on the display screen a gaming graphic user interface associated with the gaming cover or a social network service graphic user interface with respect to the social network service cover.

9. The mobile electronic apparatus of claim 1, wherein the processor is further configured to differentiate between a plurality of covers based on the output signals of the first sensor and the second sensor, each of the plurality of covers being associated with a different cover identification information that uniquely identifies a respective type of the respective covers.

10. A mobile electronic apparatus comprising:

a display unit including a display screen;

a first sensor and a second sensor configured to obtain identification (ID) information of an accessory device by detecting a magnet or a memory attached to a battery cover, wherein the accessory device includes a display cover covering the display screen and the battery cover covering a battery; and a processor displaying a user interface (UI) screen corresponding to the accessory device on the display screen by driving a first program corresponding to the obtained ID information of the accessory device when the display screen is covered by the display cover, wherein the processor is configured to execute a second program to perform a general function of the mobile electronic apparatus based on the display cover being opened, and execute the first program to perform a function corresponding to the ID information of the display cover, that is read from the display cover, based on the display cover being closed, and wherein the ID information of the accessory device is discriminated according to a combination of output signals of the first sensor and the second sensor, the output signals being different based on at least one of a position, a number, and a size of the magnet, and a type of graphic user interface, among a plurality of types of graphic interfaces, to be displayed is uniquely identified based on the ID information when the display cover is fully closed.

11. The mobile electronic apparatus of claim 10, wherein when the display screen is not covered by the accessory device, the processor performs control such that the UI screen is not displayed on the display screen.

12. The mobile electronic apparatus of claim 10, further comprising:

a secure digital (SD) card slot connecting with a connector included in the accessory device; and an external key input receiving unit receiving an external key input from an external key input unit receiving power supply through the connector.

13. The mobile electronic apparatus of claim 10, wherein the first sensor and the second sensor are illuminance sensors, proximity sensors, or cameras, embedded in the mobile electronic apparatus, and detect a cover ID mark portion of the accessory device through the illuminance sensors, the proximity sensors, or the cameras.

14. The mobile electronic apparatus of claim 10, wherein when the display screen is covered by the display cover, the first program stored in the memory attached to the battery cover is installed in an embedded memory.

15. The mobile electronic apparatus of claim 10, wherein the ID information of the accessory device uniquely identifies a type of the accessory device.

16. An electronic apparatus comprising:

a mobile electronic apparatus; and an accessory device comprising a cover covering a display screen of the mobile electronic apparatus, and a cover identification (ID) mark portion attached to the cover and identified by the mobile electronic apparatus, wherein the mobile electronic apparatus comprises:
  a display unit including the display screen;
  a first sensor and a second, sensor configured to obtain ID information of the cover by detecting the cover ID mark portion attached to the cover, when the display screen is covered by the cover; and
  a processor performing control such that a user interface (UI) screen corresponding to the cover is displayed on the display screen, by driving a first program corresponding to the obtained ID information of the cover,
wherein the processor is configured to execute a second program to perform a general function of the mobile electronic apparatus based on the cover being opened, and execute the first program to perform a function corresponding to the ID information of the cover, that is read from the cover, based on the cover being closed, and
wherein the ID information of the cover is discriminated according to a combination of output signals of the first sensor and the second sensor, the output signals being different based on at least one of a position, a number, and a size of the cover ID mark portion, and a type of graphic user interface, among a plurality of types of graphic interfaces, to be displayed is uniquely identified based on the ID information when the respective cover is fully closed.

17. The electronic apparatus of claim 16, wherein the first sensor and the second sensor are further configured to detect ID information of the accessory device by detecting a magnet or a memory attached to a battery cover, and
  wherein the processor is further configured to display the user interface (UI) screen corresponding to the accessory device on the display screen by driving the first program corresponding to the ID information of the accessory device when the display screen is covered by the cover,
  wherein the accessory device further comprises:
    a display cover configured to cover the display screen of the mobile electronic apparatus, and
    the battery cover configured to cover a battery of the mobile electronic apparatus.

18. The electronic apparatus of claim 17, wherein the accessory device further comprises a connector connected to a secure digital (SD) card slot embedded in the mobile electronic apparatus, and
  the mobile electronic apparatus further comprises an external key input receiving unit receiving an external key input by receiving power supply when the connector and the SD card slot are connected.

19. The electronic apparatus of claim 18, wherein when the display screen is covered by the display cover, the first program stored in the memory attached to the battery cover is installed in an embedded memory of the mobile electronic apparatus.

* * * * *